(12) United States Patent
Sugihara et al.

(10) Patent No.: US 9,243,845 B2
(45) Date of Patent: Jan. 26, 2016

(54) REFLOW FURNACE

(75) Inventors: Takashi Sugihara, Tokyo (JP); Hiroshi Taguchi, Tokyo (JP); Daisuke Kasahara, Saitama (JP); Koichiro Hosokawa, Selangor Darul Ehsan (MY); Yuta Saito, Saitama (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 631 days.

(21) Appl. No.: 13/514,969

(22) PCT Filed: Dec. 7, 2010

(86) PCT No.: PCT/JP2010/071903
§ 371 (c)(1),
(2), (4) Date: Jun. 8, 2012

(87) PCT Pub. No.: WO2011/071041
PCT Pub. Date: Jun. 16, 2011

(65) Prior Publication Data
US 2012/0240424 A1 Sep. 27, 2012

(30) Foreign Application Priority Data

Dec. 11, 2009 (JP) .................................. 2009-282261
Apr. 26, 2010 (JP) .................................. 2010-101326

(51) Int. Cl.
*B23K 1/00* (2006.01)
*B23K 1/008* (2006.01)
(Continued)

(52) U.S. Cl.
CPC ............... *F27B 9/3005* (2013.01); *B23K 1/012* (2013.01); *B23K 1/015* (2013.01); *B23K 3/08* (2013.01); *F27B 9/24* (2013.01); *F27D 17/001* (2013.01)

(58) Field of Classification Search
CPC .......... B23K 1/008; B23K 1/012; B23K 3/08; B23K 1/0016; B23K 1/203; F27D 17/001
USPC .............................................. 228/33, 43, 47.1
See application file for complete search history.

(56) References Cited

U.S. PATENT DOCUMENTS 5,993,500 A * 11/1999 Bailey et al. .................. 55/385.6
2003/0136020 A1 * 7/2003 Miller et al. ..................... 34/429

FOREIGN PATENT DOCUMENTS

CN 101466203 A 6/2009
JP S58-81292 A 5/1983
(Continued)

OTHER PUBLICATIONS

JP2008-272793A english computer translation.*
(Continued)

*Primary Examiner* — Erin Saad
(74) *Attorney, Agent, or Firm* — Chernoff, Vilhauer, McClung & Stenzel, LLP

(57) ABSTRACT

To prevent evaporated flux from being attached to rotation axes of motors which rotate fans positioned in a preheating zone, a main heating zone and a cooling zone and being solidified, the evaporated flux is efficiently and surely collected with the flux liquefying before the flux is solidified and having fluidity. A drain portion 20 constituting a flux collection apparatus 10A is formed at a side of a motor base 16 opposed to the fan and at a circumferential portion of the rotation axis 14. A surface of the drain portion 20 opposed to the fan is formed as an inclined surface 20A which is inclined from a level position of the motor base 16 to a discharge port 46 provided at a back side of the motor base 16. The flux collected to a center portion of the motor base 16 by the rotation drive of the fan is flown to the drain portion 20 formed in the center portion of the motor base 16, is flown along the inclined surface 20A and contained into a collection container 34 from the drain portion 20 through the discharge port 46, a drain pipe and a pipe 48.

11 Claims, 20 Drawing Sheets

(51) Int. Cl.
  *F27B 9/30*   (2006.01)
  *B23K 1/012*  (2006.01)
  *B23K 1/015*  (2006.01)
  *B23K 3/08*   (2006.01)
  *F27B 9/24*   (2006.01)
  *F27D 17/00*  (2006.01)

(56) References Cited

FOREIGN PATENT DOCUMENTS

| JP | H01-188791 A  | 7/1989  |
| JP | 5050218 A     | 3/1993  |
| JP | 7212034 A     | 8/1995  |
| JP | H11-204925 A  | 7/1999  |
| JP | 2005515078 A  | 5/2005  |
| JP | 4100578 B     | 6/2008  |
| JP | 2008-272793 A | 11/2008 |
| JP | 2009-004436 A | 1/2009  |
| JP | 2009148817 A  | 7/2009  |
| WO | 03061892 A    | 7/2003  |
| WO | 2007023604 A1 | 3/2007  |

OTHER PUBLICATIONS

International Search Report for PCT/JP2010/071903, Jan. 18, 2011.

Japanese Patent Office, Notification of Rejection Reason(s)w. attached English Translation, issued Dec. 9, 2013 in application No. 2009-282261.

Japanese Patent Office, Notification of Rejection Reason(s) with attached English Translation, issued Jan. 28, 2014 in application No. 2010-101326.

World Intellectual Property Office, International Search Report, mailed Jun. 24, 2003 in application No. PCT/US13/01504.

* cited by examiner

REFLOW FURNACE

This is a national stage application filed under 35 USC 371 based on International Application No. PCT/JP2010/071903 filed Dec. 7, 2010 and claims priority under 35 USC 119 of Japanese Patent Application No. 2009-282261 filed Dec. 11, 2009 and of Japanese Patent Application No. 2010-101326 filed Apr. 26, 2010.

TECHNICAL FIELD

The present invention relates to a reflow furnace which is provided with flux collection apparatuses each for preventing a part of flux generated and evaporated by a reflow processing from being attached to rotation axes of motors for rotating fans that are positioned in a preheating zone, a main heating zone and a cooling zone and being solidified.

Further, the present invention relates to a reflow furnace which solders electronic components on a board by performing a reflow processing on the board which mounts the electronic components on solder containing flux. Particularly, it relates to a reflow furnace which is provided with flux collection apparatuses each for preventing a part of flux generated and evaporated by a reflow processing from being attached to rotation axes of motors for rotating fans that are positioned in a preheating zone, a main heating zone and a cooling zone and being solidified.

BACKGROUND ART

When soldering electronic components on a board, a reflow furnace is generally used. The reflow furnace is provided with a conveyor for conveying the board and a reflow furnace main body (a muffle) with a tunnel shape, to which the conveyor conveys the boards. On the interior of the reflow furnace main body, a preheating zone, a main heating zone and a cooling zone are provided along a conveying path from a receiving entrance to a discharging exit. A pair of a hot-air-blowing heater and a fan is set on each of the preliminary heating and heating zones. The hot-air-blowing heater and the fan are set on respective portions above and below the conveyor. Fans for blowing cooled air that cools down the printed circuit board, which has been heated in the preheating zone and the main heating zone, and motors which rotates the fans are set on the cooling zone.

The board on which soldering paste has been previously printed is conveyed into the reflow furnace in the reflow processing. The soldering paste printed on the board contains powdered solder, solvent and flux. Among them, the flux contains rosin or the like as its component so that the flux has an effect to remove an oxide film from a metal surface to be soldered, to prevent reoxidation by applying heat thereto when soldering and to make surface tension of the solder smaller so as to become improved in wettability thereof.

From the board conveyed in the reflow furnace, the solvent contained in the soldering paste is volatilized in the preheating zone. Next, in the main heating zone, heated wind is blown to the board which is conveyed by the conveyor from the upper and lower directions so that the soldering paste is fused. In the cooling zone, the heated board is then cooled and the fused solder is solidified. Under such a series of steps, the electronic components are soldered on any junctions on the printed circuit board.

Incidentally, in the above-mentioned heating step, the flux is evaporated by applying heat thereto with the heater and is filled in the reflow furnace main body. The flux filled in the reflow furnace main body is generally cleaned via a removing apparatus for removing a flux component, which is set outside the muffle, and is then again returned to the muffle via a circulation path. However, since, accompanying the rotation of the fans set on the preheating zone, the main heating zone and the cooling zone, a flow flown into a back side of each of the fans occurs, a part of the evaporated flux may be flown into the back side of each of the fans by this flow. The evaporated flux which is flown into the back side of each of the fans is here cooled to become liquid flux having any fluidity. When the rotation of the motor stops and internal temperature thereof drops after the evaporated flux becomes liquid flux, viscosity of the liquid flux is increased and its fluidity drops so that the flux is solidified and accumulated on a base portion thereof. In this moment, a problem occurs such that when the flux is solidified on the rotation axis of each of the fans, the rotation of each of the fans is obstructed.

In order to prevent the flux from being accumulated, a reflow furnace which is provided with an inclined portion that is inclined from an axis of the fan to its circumference and a gas inlet for inserting the gas having a temperature which is capable of liquefying the flux on a bottom of a casing of the reflow furnace has been proposed (see Patent Document 1). Flux collection openings are provided on two positions on a periphery of the bottom of the casing of the reflow furnace so that the flux on the bottom is flown along the inclined surface and flown into the flux collection openings, thereby preventing the flux component from being accumulated.

PRIOR ART DOCUMENTS

Patent Document

Patent Document 1: Japanese Patent Application Publication No. 2008-272793.

DISCLOSURE OF THE INVENTION

Problems to be solved by the Invention

However, there are following problems in the reflow furnace disclosed in the above-mentioned Patent Document 1. (1) The flux which is flown into the back of each of the fans and liquefied is flown in opposition to an inclined direction of the inclined surface by a wind toward a central portion of the fan, which occurs when rotating the fan so that it has a tendency to be collected on the rotation axis (the central portion) of the fan. In this moment, there is a problem such that when coming the flux into a seal portion of the rotation axis, the flux is solidified by dropping the temperature following the stop of the fan so that the axis of the motor freezes based on the solidification of the flux and the motor does not normally rotate by over load of the motor. In this case, since the reflow furnace cannot be driven, a problem occurs such that any operations to remove the flux solidified on the motor are required.

(2) In recent years, a high air tight seal member is attached to a portion between the rotation axis of the motor and a center drain block around the axis. Thus, since any pressure of the vicinity thereof is not escaped to the outside or the like, a state of high air tightness occurs at the back side of the fan or in a flux collection container. Under such a state of high air tightness, the fluidity of the flux becomes worse even if the inclined surface inclined to the drain portion of the base member as disclosed in the Patent Document 1 is provided, so that there is a case where the flux stagnates on a motor base.

As a result thereof, a problem of re-evaporation of the flux and/or any contamination following the stagnation of the flux occurs.

(3) In the conventional reflow furnace, since a pipe provided between the drain portion and the flux collection container extends obliquely, there has been a case where the flux flown from the drain portion stagnates on the way through the pipe even if the flux flows from the base member to the drain portion. In this case, a problem occurs such that the flux is accumulated and solidified on the way of the pipe so that the pipe is plugged. Problems of solidification of the flux in the pipe often occur, particularly, in a connection portion connecting the pipes themselves.

The invention, then, solves the above-mentioned problems and has an object to provide a reflow furnace which is provided with flux collection apparatuses, each of which is capable of collecting liquefied flux with fluidity efficiently and surely before the evaporated flux is solidified to prevent the evaporated flux from being attached to rotation axes of the motors for rotating fans that are positioned in the preheating zone, the main heating zone and the cooling zone and being solidified.

The invention also has another object to provide a reflow furnace which can prevent the flux from being left on the base member or in the pipe or the like.

Means for solving the Problems

In order to solve the above-mentioned problems, a reflow furnace according to the invention is provided with a reflow furnace main body including a motor, a fan connected with the motor through a rotation axis thereof and a case member containing the fan, and a flux collection apparatus which collects flux generated by a reflow processing in the reflow furnace main body, characterized in that the flux collection apparatus includes a base member which is attached to the case member and a drain portion which is provided at a side of the base member facing toward the fan and at a circumferential portion of the rotation axis, the drain portion receiving the flux generated by the reflow processing and draining it to outside.

A rotation drive of the fan causes wind (pressure) which flows toward a direction of the rotation axis between the fan and the base member. Flux flown to a back side of the fan is thus collected to the rotation axis by the wind blown to a central direction. In this invention, since the drain portion is provided at a side of the base member opposed to the fan of the base member and at a circumferential portion of the rotation axis, the flux collected to the rotation axis by the rotation drive of the fan is flown to the drain portion and is drained from the drain portion to the outside. It is to be noted that the flux in this invention is referred to as "flux including evaporated flux, liquid flux having any fluidity and solidified flux."

Further, a reflow furnace according to the invention is provided with a flux collection apparatus which collects flux generated by a reflow processing in a reflow furnace main body including a driving portion and a fan connected with the driving portion through a rotation axis thereof, characterized in that the flux collection apparatus includes a base member which is attached to the reflow furnace main body, a drain portion which is provided at a side of the base member opposed to the fan and at a circumferential portion of the rotation axis, the drain portion receiving the flux generated by the reflow processing and draining it to outside, a flux collection portion which collects the flux through the drain portion and a decompression portion which reduces pressure within the flux collection portion.

Additionally, a reflow furnace according to the invention is provided with a flux collection apparatus which collects flux generated by a reflow processing in a reflow furnace main body including a driving portion and a fan connected with the driving portion through a rotation axis thereof, characterized in that the flux collection apparatus includes a base member which is attached to the reflow furnace main body, a drain portion which is provided at the base member, the drain portion receiving the flux accumulated on the base member and draining it to outside, a discharge pipe having an end connected with the drain portion through a drain pipe and the other end extending from the drain pipe toward a vertical direction and a flux collection portion which is detachably attached to the other end of the discharge pipe and collects the flux flown through the discharge pipe.

Still further, a reflow furnace according to the invention is provided with a flux collection apparatus which collects flux generated by a reflow processing in a reflow furnace main body including a driving portion and a fan connected with the driving portion through a rotation axis thereof, characterized in that the flux collection apparatus includes a base member which is attached to the reflow furnace main body, a drain portion which is provided at the base member, the drain portion receiving the flux accumulated on the base member and draining it to outside, a discharge pipe having an end connected with the drain portion through a drainpipe and the other end extending from the drain pipe and a flux collection portion which is detachably attached to the other end of the discharge pipe and collects the flux flown through the discharge pipe, wherein an outer diameter of the end of the drain pipe at a side of discharge pipe is set so as to be not larger than an inner diameter of the discharge pipe connected with this end so that the end of the drain pipe is inserted and attached to the discharge pipe.

Effects of the Invention

According to the invention, since the drain portion is provided at the base member and at a portion located circumferentially about the rotation axis the flux inevitably collected to the rotation axis can be flown into the drain portion efficiently and surely, thereby allowing a solidification of the flux on the rotation axis to be prevented. As a result thereof, since it is possible to save a period of time on an operation for detachment of the driving portion, the fan and the base member, and a cleaning operation, on the basis of the solidification of the flux, its production efficiency can be greatly improved.

Further, according to the invention, since the decompression portion reduces the pressure within the flux collection portion, the flux accumulated on the base member, the drain portion and/or the like can be drawn into the flux collection portion by force.

Additionally, according to the invention, the discharge pipe provided between the drain portion and the flux collection portion extends to a vertical direction, the flux flown into this discharge pipe can be dropped into the flux collection portion by its weight.

Thereby, it is possible to contain the flux into the flux collection portion easily and successfully without accumulating the flux on the way of the discharge pipe.

BEST MODE FOR CARRYING OUT THE INVENTION

The following will describe the best mode for carrying out the present invention (hereinafter, referred to as "embodiment").

<First Embodiment>
[Configuration Example of Reflow Furnace]

Figure 1:
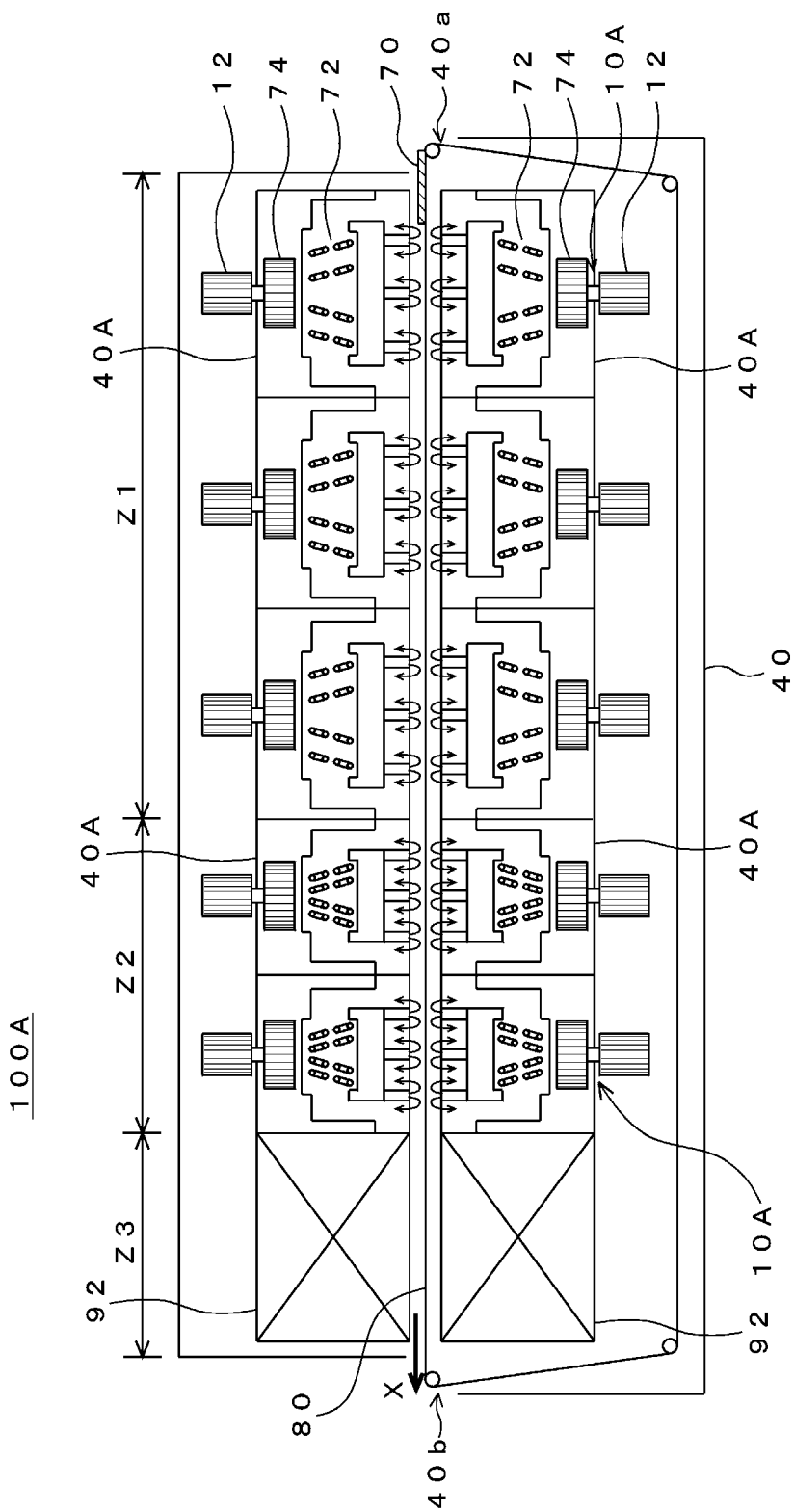
[FIG. 1] is a diagram showing a configuration example of a reflow furnace according to a first embodiment of the invention.

As shown in FIG. 1, a reflow furnace 100A is provided with a reflow furnace main body (muffle) 40, a conveyor 80, heaters 72, fans 74, motors 12 and flux collection apparatuses 10A. The reflow furnace main body 40 is a housing extending like a tunnel and having a receiving entrance 40a and a discharging exit 40b. The reflow furnace main body 40 has a preheating zone Z1, a main heating zone Z2 and a cooling zone Z3 along a conveying path from the receiving entrance 40a to the discharging exit 40b. The conveyor 80 extends along the conveying path from the receiving entrance 40a to the discharging exit 40b and conveys the printed circuit board 70 at a desired speed from the receiving entrance 40a to the discharging exit 40b in the reflow furnace main body 40 (to a direction of an arrow X (conveying path)).

The heaters 72, the fans 74 and the motors 12 are respectively provided at the preheating zone Z1 and the main heating zone Z2 and they are positioned so as to be opposed to each other at upper and lower directions of the conveyor 80, respectively. In this embodiment, three units each composed of a pair of the heaters 72, a pair of the fans 74 and a pair of the motor 12 are configured in the preheating zone Z1 and similarly, two units each composed of a pair of the heaters 72, a pair of the fans 74 and a pair of the motors 12 are configured in the main heating zone Z2. The heater 72 and the fan 74 which constitute one unit in the preheating zone Z1 and the main heating zone Z2 are housed in a case member 40A formed as a box.

The heaters 72 set in the preheating zone Z1 and the main heating zone Z2 heat gas within the reflow furnace main body 40 to generate heated wind having high temperature. The fans 74 are composed of, for example, sirocco fans and rotate by the driving of the motors 12 to allow the heated wind which is heated by the heaters 72 to be blown onto the printed circuit board 70 from the upper and lower directions thereof. This enables solder on the printed circuit board 70 to be fused so that any electronic components or the like are fixed on the electrodes of the printed circuit board 70. It is to be noted that the heaters 72, the fans 74 and the motors 12, which are set in the preheating zone Z1 and the main heating zone Z2, having the same configuration are used.

In the cooling zone Z3, fans and motors (not shown) which blow cooled wind for cooling the printed circuit board which has been heated in the preheating zone Z1 and the main heating zone Z2 are set. In this embodiment, the cooling zone Z3 is composed of a unit excluding the heater 72 from each of the units of the preheating zone Z1 and the main heating zone Z2 and a cooling device 92 is composed of the fan and the motor.

The flux collection apparatuses 10A are apparatuses each for efficiently collecting the evaporated flux which is generated by a reflow processing to the printed circuit board 70 by the heaters 72 and the fans 74, with the flux being liquid flux having fluidity. In this embodiment, the flux collection apparatus 10A is provided for every unit of the fan 74 and the motor 12. The flux collection apparatuses 10A may be configured so that they are different from each other for every zone of the preheating zone Z1, the main heating zone Z2 and the cooling zone Z3 corresponding to any flux components generated in the preheating zone Z1 and the main heating zone Z2, respectively. The flux collection apparatuses 10A may be also configured so that they are different from each other for every unit constituting each zone. The flux collection apparatus 10A will be described later.

<Operation Example of Reflow Furnace>

Next, the following will describe an operation example of the reflow furnace 100A. As shown in FIG. 1, the printed circuit board 70 on which surface mounting electronic components are mounted is placed on the conveyor 80 and is then conveyed into the reflow furnace 100A from the receiving entrance 40a. In the preheating zone Z1 in the reflow furnace 100A, the heated wind is blown onto the printed circuit board 70 by driving the heaters 72, the fans 74 and the motors 12 which are placed on and below the conveyor 80. This enables the flux to be activated and oxidize film on a surface of an electrode or solder paste to be removed.

In this moment, the evaporated flux which is generated by the reflow processing is filled within the reflow furnace main body 40, is cleaned via a remover, not shown, for removing flux component, which is generally placed out of the oven, and is again returned into the oven through a circulation path. However, since, following the rotation of the fans 74 placed in the preheating zone Z1, the main heating zone Z2 and the cooling zone Z3, a flow flowing round a back side of each of the fans 74 occurs, a part of the evaporated flux is flown round the back side of each of the fans 74 by this flowing. In this embodiment, since the flux collection apparatus 10A is set up for every unit of the motor 12 and the fan 74, a part of the evaporated flux flown round the back side of each of the fans 74 set up in the preheating zone Z1 is collected by the flux collection apparatus 10A.

Next, when conveying the printed circuit board 70 in the main heating zone Z2, the solder is fused so that the electronic components are fixed on the printed circuit board 70. The flux or the like generated in this moment is also collected by the flux collection apparatus 10A as described above. Finally, when conveying the printed circuit board 70 in the cooling zone Z3, the printed circuit board 70 is rapidly cooled so that solder composition is formed. The printed circuit board 70 cooled in the cooling zone Z3 is then discharged out of the discharging exit 40b. It is to be noted that the evaporated flux which is generated by blowing the heated wind is also collected by the flux collection apparatus 10A provided for every cooling device 92 in the cooling zone Z3.

[Configuration Example of Flux Collection Apparatus]

Next, the following will describe a configuration example of the flux collection apparatus 10A. The flux collection apparatus 10A according to the invention is provided with a motor base 16, which is an example of the base member, a high-necked collar portion 18, a drain portion 20, a drain pipe 38 and a collection container 34, as shown in FIGS. 2 through 5. It is to be noted that since liquid flux accumulated on the motor base 16 is flown below by its weight, the flux collection apparatus 10A according to the invention is basically placed below only the conveyor 80 of the reflow furnace 100A shown in FIG. 1.

The motor base 16 is made of metallic material such as stainless steel (SUS) or aluminum which is excellent at corrosion resistance and thermal resistance. The motor base 16 is a disk like member having an outer diameter that is slightly larger than the fan 74 and is attached to a bottom of the case member 40A (see FIG. 1) that houses the fan 74 and the like through a fastening member such as screws. The motor base 16 has, on a side opposed to the fan 74, a wall portion 16b formed on a periphery of the motor base 16 and an inclined surface 16a inclined so that a height of the plain portion thereof falls from the wall portion 16a to the rotation axis 14. Since the drain portion 20 is formed around the rotation axis 14, which will be described later, it is possible to flow the flux accumulated on the motor base 16 to the drain portion 20 formed in the motor base 16 successfully by the inclined surface 16a.

The motor 12 is attached to a back side of the motor base 16 (at the opposite side of the fan 74) through a central drain block 22. The motor 12 is connected with, for example, a commercial power supply portion 200 and drives the rotation of the fan 74 through the rotation axis 14 based on an instruction from a control apparatus, not shown. Of the rotation axis 14, an end is rotatably attached to the motor 12 and a portion of the other end, which extends from the motor base 16 toward a side of the fan 74, is attached to the fan 74.

Figure 6:
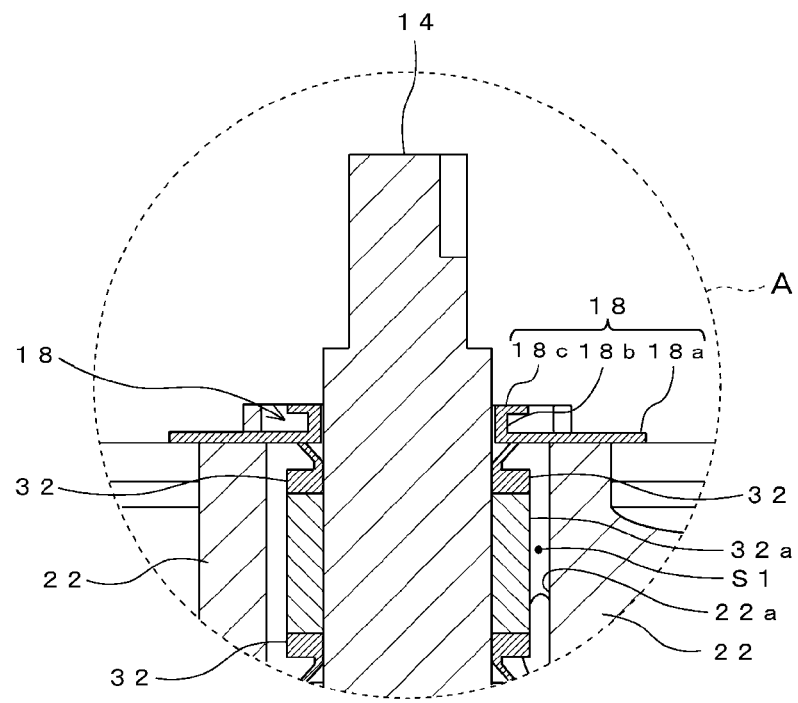
[FIG. 6] is an enlarged sectional view of an important portion of the flux collection apparatus for showing the configuration example thereof.

As shown in FIG. 6, a seal member 32 for preventing flux fume or the like from being come into a clearance S1 between the rotation axis 14 and the central drain block 22 is inserted between an outer circumferential surface 14a of the rotation axis 14 and an inner circumferential surface 22a of the central drain block 22. As the seal member, for example, any contact type seal member such as oil seal, V packing and Teflon (registered trademark) seal, any contactless type seal member (for example, labyrinth seal) and the like are used. In this embodiment, a case where V packing and Teflon (registered trademark) seal are used is shown.

Figure 7A:
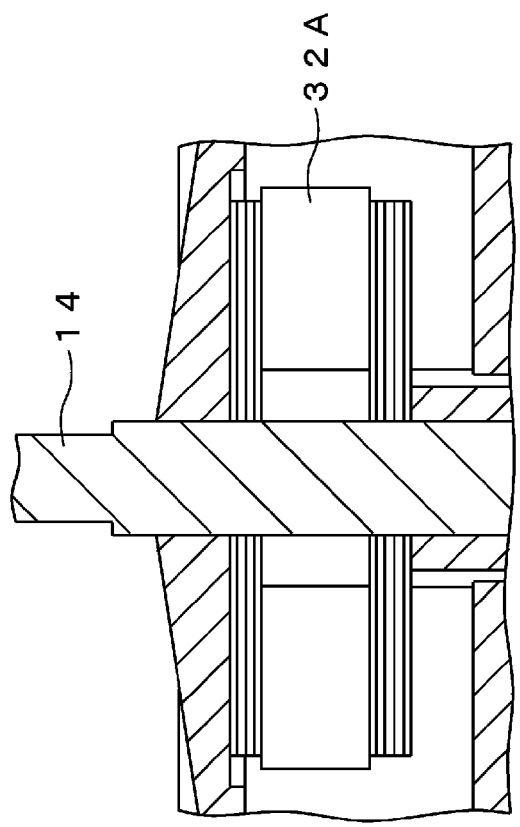
[FIG. 7A] is a diagram of other seal member for showing a configuration example (part one) thereof.
Figure 7B:
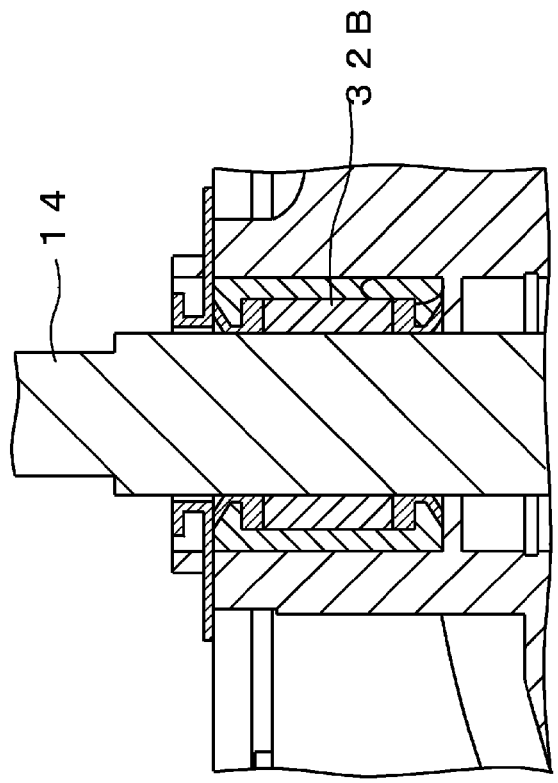
[FIG. 7B] is a diagram of other seal member for showing the configuration example (part two) thereof.
Figure 7C:
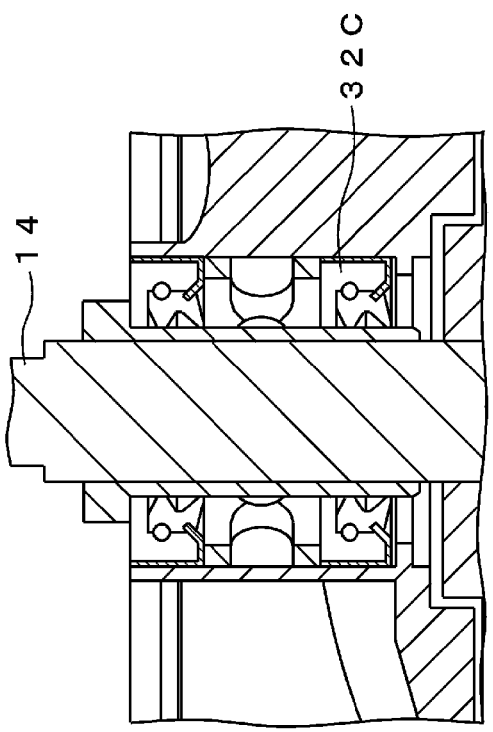
[FIG. 7C] is a diagram of other seal member for showing the configuration example (part three) thereof.
Figure 7D:
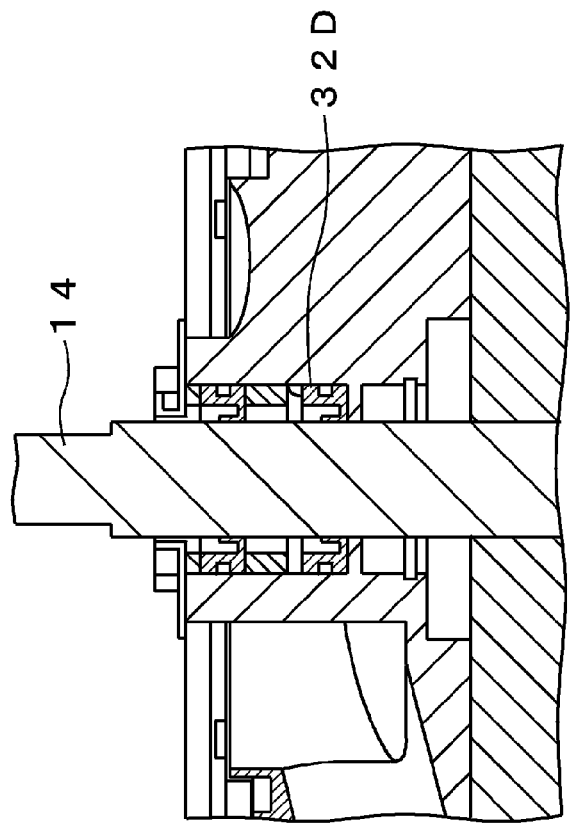
[FIG. 7D] is a diagram of other seal member for showing the configuration example (part four) thereof.

Here, the following will describe cases where other seal members 32A, 32B, 32C and 32D are used. As shown in FIG. 7A, when using a contactless type seal member (labyrinth seal) as the seal member 32A and injecting nitrogen gas ($N_2$ purge), no grease is required because of contactless type one so that it has an effect to be able to reduce any costs. Next, when, as shown in FIG. 7B, using a contact type V packing as the seal member 32B and performing enclosure using grease, and as shown in FIG. 7C, using a contact type oil seal as the seal member 32C and performing enclosure using grease, it has an effect to be able to prevent any flux from being flown into the clearance S1 of the rotation axis 14 successfully. Further, as shown in FIG. 7D, when using a contact type Teflon (registered trademark) seal as the seal member 32D and injecting nitrogen gas ($N_2$ purge), it has an effect to be able to prevent any flux from being flown successfully and to require no grease.

As shown in FIG. 6, the high-necked collar portion 18 is positioned above the seal member 32 and around a circumferential direction of the rotation axis 14 and prevents the flux or the like from being come into the clearance S1 between the rotation axis 14 and the central drain block 22. This high-necked collar portion 18 is configured so that a base portion 18a, a cylinder portion 18b and a turn-back portion 18c are united one another. The base portion 18a is composed of an annular body having an inner diameter that is almost the same diameter as an outer diameter of the rotation axis 14 and is attached to an upper surface portion of the motor base 16 through a fastening member such as screws. The cylinder portion 18b stands upward from an inner periphery portion of the base portion 18a and is positioned circumferentially around the rotation axis 14. The turn-back portion 18c is turned back outward from an upper edge of the cylinder portion 18b and extends outward by a predetermined length.

By such a configuration, it is possible to prevent flux fume, largely, from being surely come into the clearance S1 of the rotation axis 14.

Figure 2:
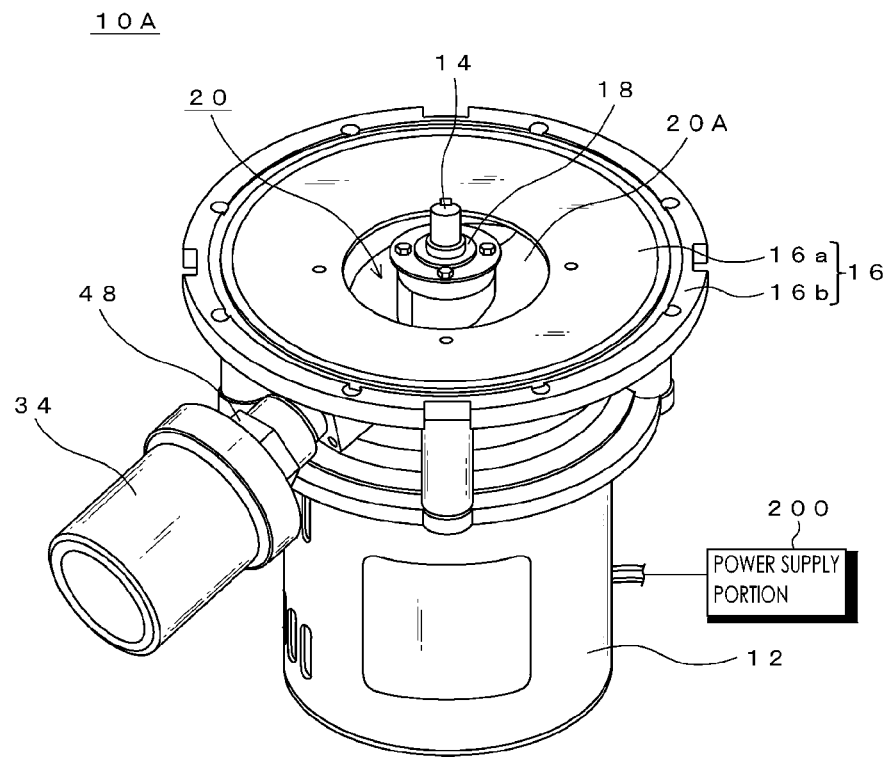
[FIG. 2] is a perspective view of a flux collection apparatus for showing a configuration example thereof.
Figure 3:
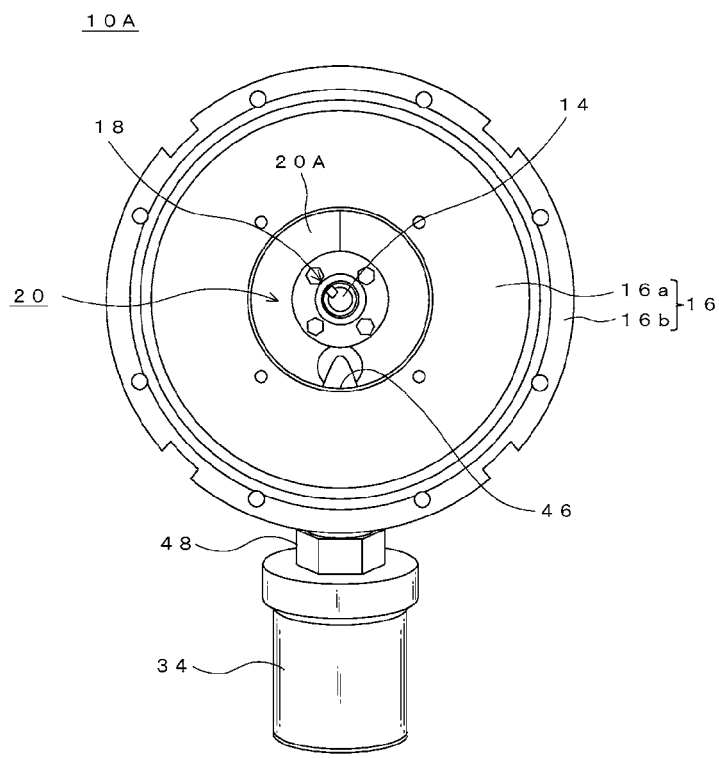
[FIG. 3] is a top view of the flux collection apparatus for showing the configuration example thereof.
Figure 4:
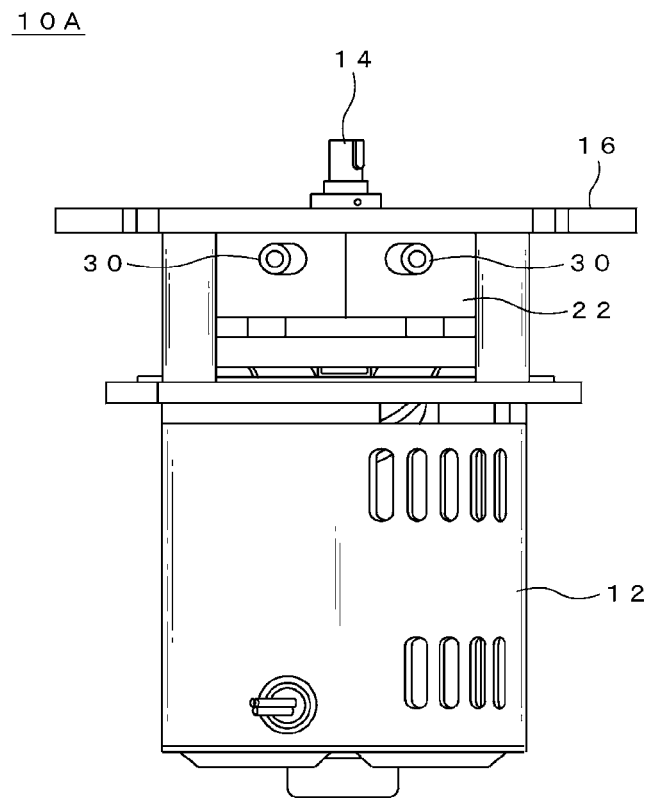
[FIG. 4] is a side view of the flux collection apparatus for showing the configuration example thereof.
Figure 5:
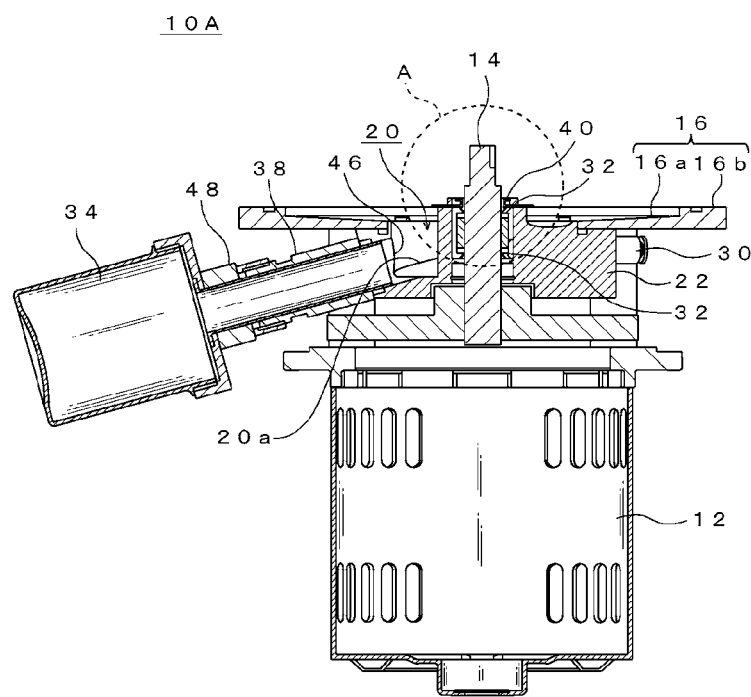
[FIG. 5] is a sectional view of the flux collection apparatus for showing the configuration example thereof.
Figure 8:
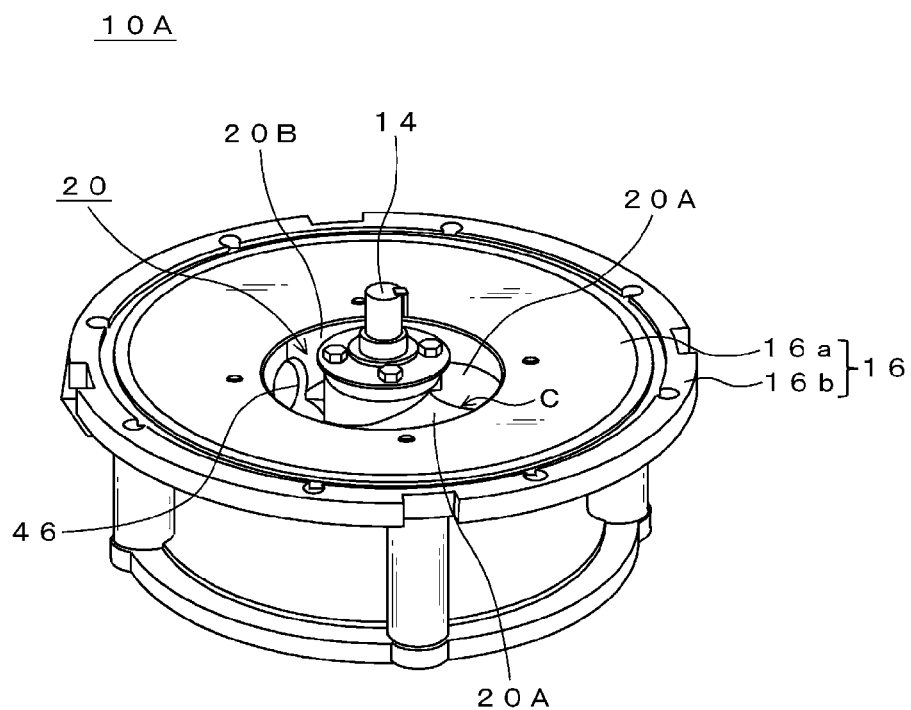
[FIG. 8] is a perspective view of an important portion of the flux collection apparatus for showing a configuration example thereof.

The drain portion 20 is composed of a groove (a hollow portion) for discharging the flux and the like accumulated on the motor base 16 from the motor base 16 to outside and is provided at a circumferential portion of the rotation axis 14 positioned at a center of the motor base 16. Namely, in this embodiment, the drain portion 20 is formed at the center of the motor base 16 and around the circumferential direction of the rotation axis 14, which has a ring shape viewed from a plane thereof. Forming the drain portion 20 at the center portion of the motor base 16 is because it is taken into a consideration that the flux is collected on the center portion (the rotation axis 14) of the motor base 16 by any wind generated when the fan 74 rotates and blown toward the center. This drain portion 20 has an inclined surface 20A, as shown in FIGS. 2, 5 and 8, which is inclined from a level position of the motor base 16 to a drainpipe 38 (a discharge port 46) provided at a back side of the motor base 16. An upstream C of this inclined surface 20A is formed so as to have a curved mountain shape in which its center portion has a high level and a height thereof falls down to wall portion 20B of both sides (see FIG. 8). On the wall portion 20B positioned at a downstream of the inclined surface 20A of the drain portion 20, the discharge port 46 for discharging the flux flown into the drain portion 20 to outside is formed, as shown in FIG. 8. The drain pipe 38 which extends outward and obliquely to the lower is connected with the discharge port 46. It is to be noted that the drain pipe 38 constitutes an example of a first discharge pipe.

Figure 9:
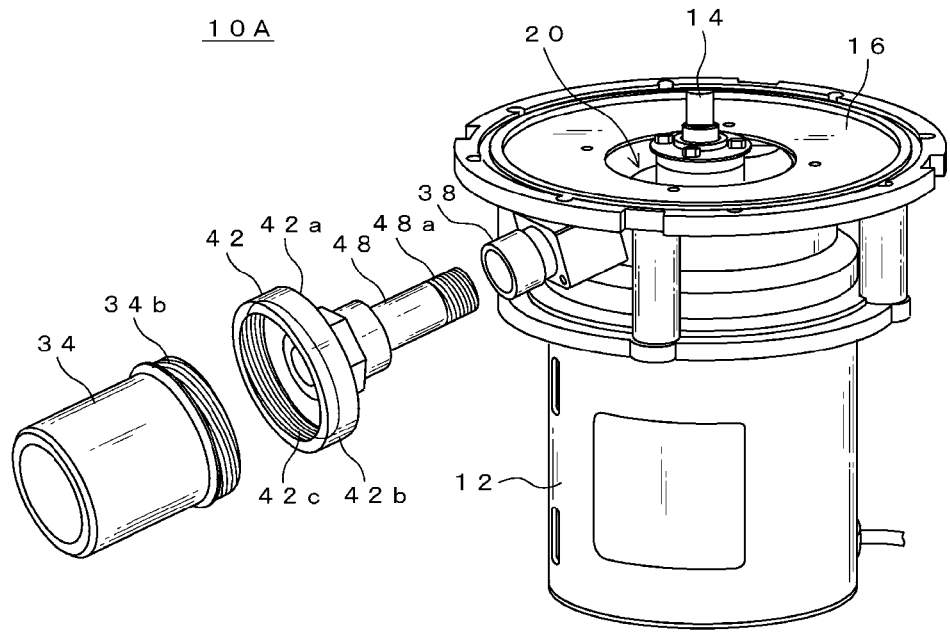
[FIG. 9] is a perspective view of the flux collection apparatus for showing a configuration example thereof when it is attached or detached.

To the drain pipe 38, a pipe 48 is connected. Of the pipe 48, an outer diameter is selected so as to become almost the same as an inner diameter of the drain pipe 38 so that it is configured so as to be detachably inserted into the drain pipe 38. Accordingly, there is an overlapped structure of the drain pipe 38 and the pipe 48 in a discharge portion of the drain portion 20. It is to be noted that the pipe 48 constitutes an example of a second discharge pipe. A length of the pipe 48 along a longitudinal direction thereof is selected so as to become longer than a length of the drain pipe 38 along a longitudinal direction thereof (see FIG. 12) and when inserting the pipe 48 into the drain pipe 38, a forward end of the pipe 48 extends up to a near position of the discharge port 46. Accordingly, even if the flux stops near the discharge port 46, the stopped flux stagnates within the pipe 48, not the drain pipe 38, so that it is possible to avoid stagnation of the flux near the discharge port 46 by extracting the pipe 48 itself. A spiral groove 48a is formed on an outer circumferential portion of a forward end of the pipe 48 as shown in FIG. 9 and it can be attached to the drain pipe 38 by screwing the pipe 48 into a spiral groove, not shown, formed inside the drain pipe 38.

To an outer end of the pipe 48, a container cap 42 functioning as a cap of the collection container 34, which will be described later, is attached. The container cap 42 is composed of a top surface portion 42a with a diameter that is almost the same as an outer diameter of the collection container 34 and a side wall portion 42b extending from an outer periphery of the top surface portion 42a. A spiral groove 42c corresponding to a spiral groove 34b of the collection container 34 is formed on an inner circumferential surface of the side wall portion 42b.

The collection container 34 is connected with the drain pipe 38 through the pipe 48 and contains the flux flown through the drain portion 20, the discharge port 46, the drain pipe 38 and the pipe 48. On a periphery of an upper end of the collection container 34, the spiral groove 34b is formed as shown in FIG. 9. It is possible to attach the collection container 34 detachably to the pipe 48 by fitting the spiral groove 34b of the collection container 34 to the spiral groove 42c formed on the container cap 42. This collection container 34 is selected so as to have a size such that an operator can detach it easily and a certain amount of flux can be contained. Further, the collection container 34 maybe made of transparent material so as to be ready to check an amount of the flux collected in the collection container 34.

Figure 10:
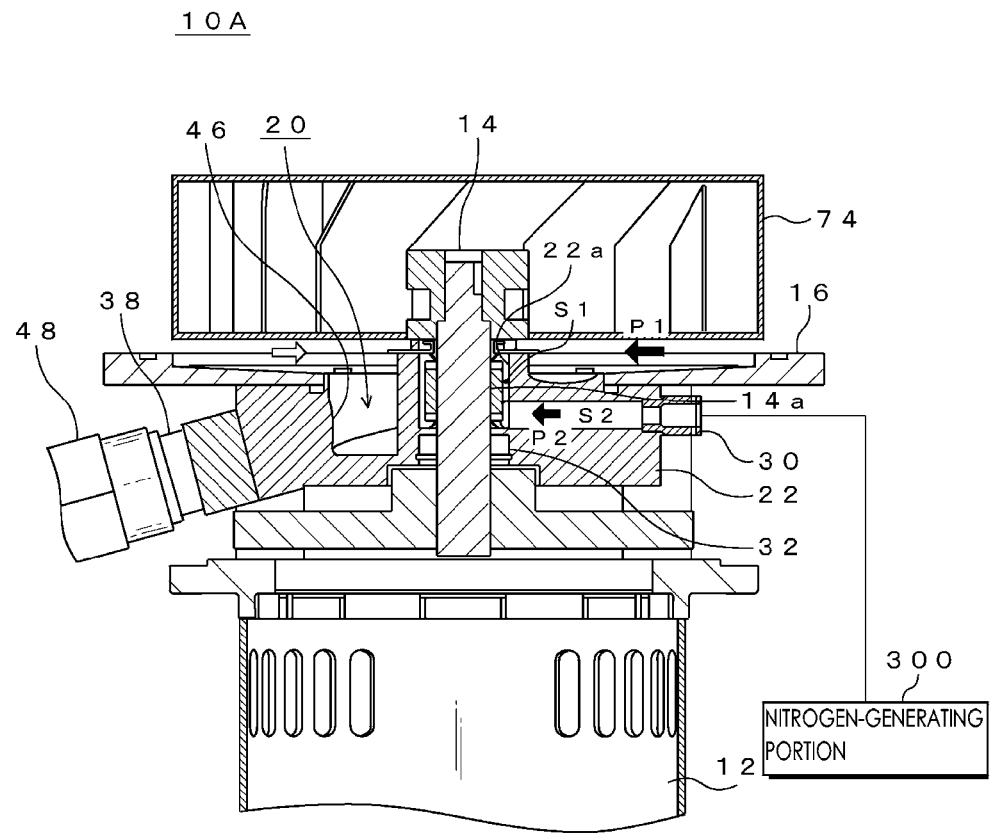
[FIG. 10] is a diagram for illustrating a nitrogen purge.

In the central drain block 22, a nitrogen space S2 for injecting nitrogen gas to the clearance S1 between an outer circumferential surface 32a of the seal member 32 and an inner circumferential surface 22a of the central drain block 22 is formed as shown in FIGS. 6 and 10. The nitrogen space S2 is a space for setting pressure P2 in the clearance S1 so as to be higher than pressure P1 at a side of reflow furnace main body 40 by injecting nitrogen gas into the clearance S1 and an inner introduction port thereof is communicated with the clearance S1 and an outer injection port thereof is communicated with outside. Half union 30 is attached to the injection port of the nitrogen space S2 and a nitrogen-generating portion 300 for generating the nitrogen gas is connected with the half union 30. Further, a grease injection portion, not shown, for injecting grease for the seal member 32 is provided in the central drain block 22, apart from the nitrogen space S2.

In this embodiment, when the reflow furnace 100A is turned on, the nitrogen gas is introduced into the reflow furnace main body 40 from the nitrogen introduction port, not shown, and the pressure P1 in the oven is set so as to be 500 Pa. On the other hand, when the reflow furnace 100A is turned on, the nitrogen gas is injected from the nitrogen-generating portion 300 into the nitrogen space S2 through the half union 30 and the pressure P2 of the clearance S1 is adjusted so as to be, for example, 0.3 Mpa or less. Accordingly, the pressure P2 of the clearance S1 between the outer circumferential surface 32a of the seal member 32 and the inner circumferential surface 22a of the central drain block 22 becomes higher than the pressure P1 in the reflow furnace main body 40 so that since a flow of the nitrogen gas from the clearance S1 to the reflow furnace main body 40 occurs, it is possible to prevent the flux from being come into a clearance between the rotation axis 14 and the seal member 32 surely by preventing the flux from being come into the clearance S1. As a result thereof, it is possible to avoid any fixation of the flux to the rotation axis 14.

[Operation Example of Maintenance at Normal Case]

Figure 11:
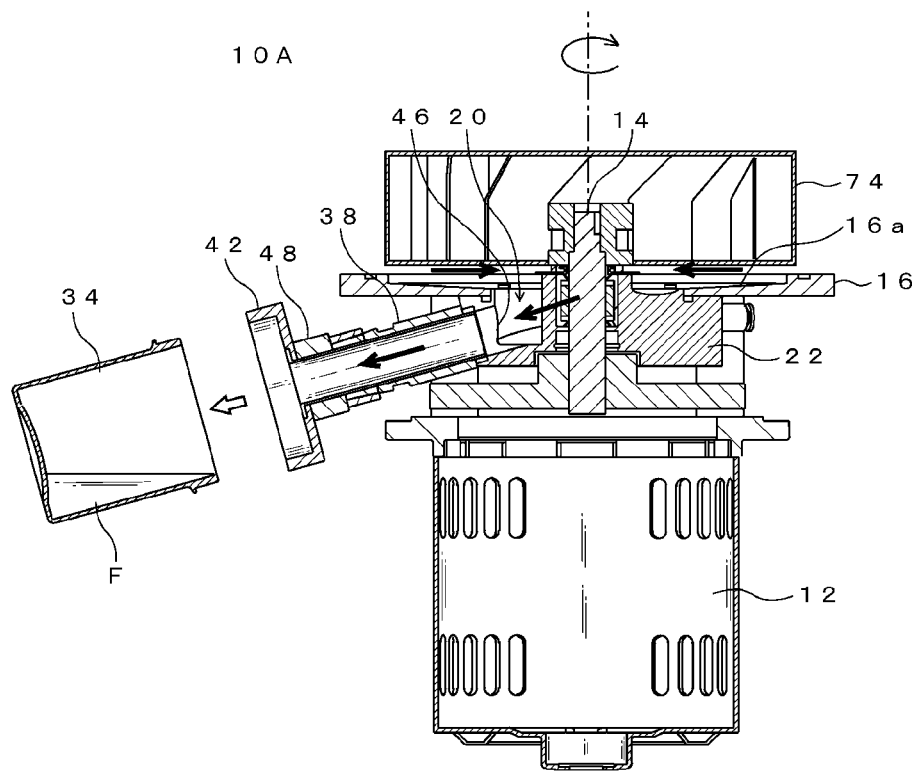
[FIG. 11] is a diagram for showing an operation example of maintenance at a normal case.

As shown in FIG. 11, when the reflow furnace 100A is turned on and the fans 74 are driven, wind from outside toward a center occurs at the back side of each of the fans 74. By this wind blown to the center, the evaporated flux F flown round the back side of each of the fans 74 is cooled by the motor base 16 and the liquid flux F having fluidity collects to the rotation axis 14 provided at the center of the motor base 16 along the inclined surface 16a of the motor base 16. The liquid flux F having fluidity, which collects to the center of the motor base 16, is flown into the drain portion 20 formed around the rotation axis 14 as it is.

The flux F flown into the drain portion 20 is contained in the collection container 34 via the discharge port 46, the drain pipe 38 and the pipe 48 of the drain portion 20. The operator checks whether or not a set amount of the flux F is accumulated in the collection container 34 at a predetermined timing and if he determines that the set amount of the flux F is accumulated in the collection container 34, then he detaches the collection container 34 from the container cap 42 of the pipe 48 as shown in FIG. 11 and then, collects the flux F which is contained in the collection container 34. When he empties the collection container 34, he again attaches the collection container 34 to the container cap 42 to be set.

[Operation Example at Abnormal Case]

Figure 12:
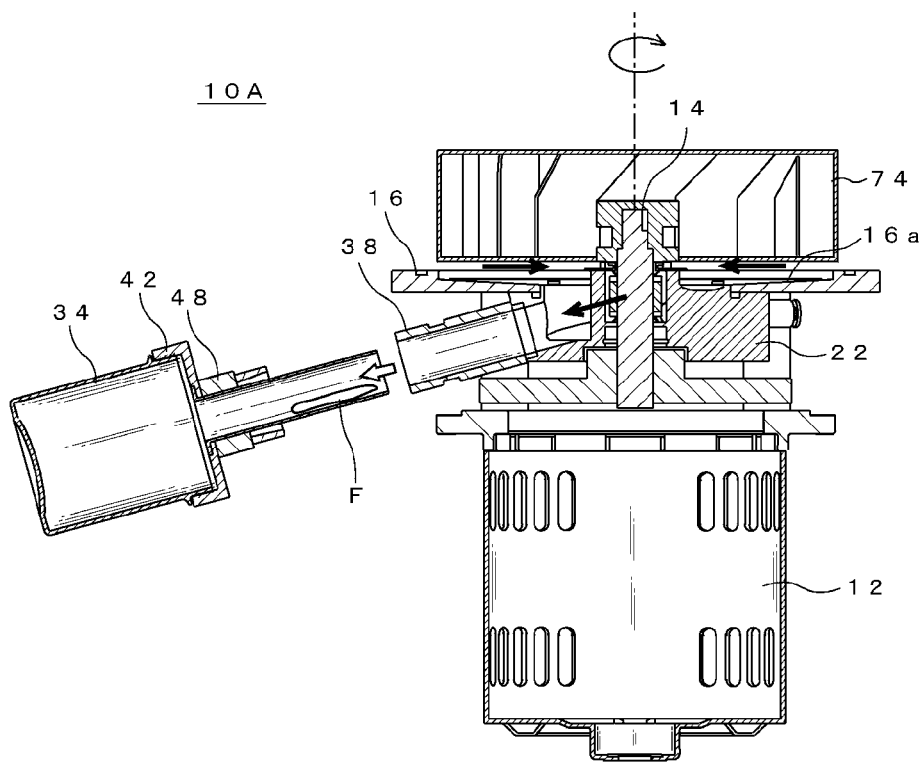
[FIG. 12] is a diagram for showing an operation example of maintenance at an abnormal case.

When the liquid flux F having fluidity is solidified and the flux F stops on the way of the discharge path based on the lowering of the temperature of the flux F after the reflow furnace 100A stops, the operator extracts the pipe 48 from the drain pipe 38 as shown in FIG. 12. Since the solidified flux F which stops on the way of the discharge path is accumulated on a side of the extracted pipe 48, not the drain pipe 38, it is possible to avoid remaining the solidified flux F in the drain pipe 38. The operator cleans an interior of the extracted pipe 48 to remove the solidified flux F and again attaches the pipe to the drain pipe 38 to be set.

As described above, according to the first embodiment, since the drain portion 20 is provided at the motor base 16 and around the rotation axis 14, it is possible to flow the liquid flux with fluidity into the drain portion 20 efficiently and surely before the evaporated flux F which inevitably collects to the rotation axis 14 when the fan 74 rotates is solidified and discharge the flux F to outside. Accordingly, it is possible to prevent the flux F from coming into the rotation axis 14 and prevent the flux F from being fixed to the rotation axis 14. As a result thereof, since a period of operation time such as the detachment operation of the motor 12, the fan 74 and the motor base 16, the cleaning operation or the like based on the fixation of the flux F can be reduced, it is possible to improve a productivity thereof greatly by only that.

Further, in the first embodiment, the drain portion 20 is provided at one position of the motor base 16 and the drain pipe 38 connected with this drain portion 20 extends outward and obliquely to the lower. Accordingly, by extending the drain pipe 38 facing one openable side surface of the reflow furnace 100A, it is possible to perform a detachment operation of the collection container 34 or a cleaning operation easily and efficiently. This enables warkload of the operator to be greatly reduced.

Additionally, since the drain is configured to have an overlap structure of the drain pipe 38 and the pipe 48, it is possible to clean an interior of the pipe 48 easily outside the reflow furnace 100A by detaching the inner pipe 48 from the drain pipe 38 even when the flux F stagnates (stops) on the way of the discharge path. Further, since the flux F does not remain in the drain pipe 38, it is possible to prevent the flux F from stopping surely.

Still Further, by providing the high-necked collar portion 18 having turn-back structure around a circumferential direction of the rotation axis 14, it is possible to prevent the flux F or the flux fume from being surely come into the clearance S1 between the seal member 32 and the rotation axis 14. Further, according to this embodiment, since the pressure in the clearance S1 between the rotation axis 14 and the center drain block 22 is set so as to be higher than the pressure in the reflow furnace main body 40, it is possible to prevent the flux F or the flux fume from being surely come into the clearance S1.

<2. Second Embodiment>

A flux collection apparatus 10B according to the second embodiment is different from the flux collection apparatus 10A described in the first embodiment in that the apparatus 10B is provided with a heater to heat the flux. It is to be noted that since other configuration of the flux collection apparatus 10B is the same as that of the flux collection apparatus 10A described in the above-mentioned first embodiment, the same signs are affixed to common components, detailed descriptions of which will be omitted.

[Configuration Example of Flux Collection Apparatus]

Figure 13:
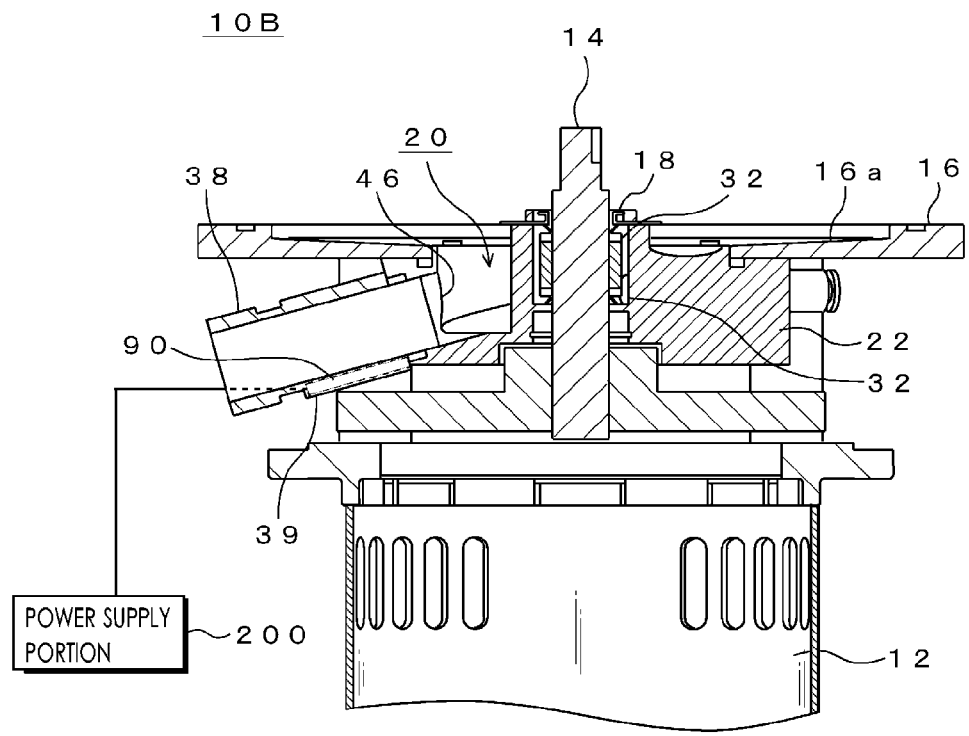
[FIG. 13] is a diagram showing a configuration example of a flux collection apparatus according to a second embodiment of the invention.
Figure 14:
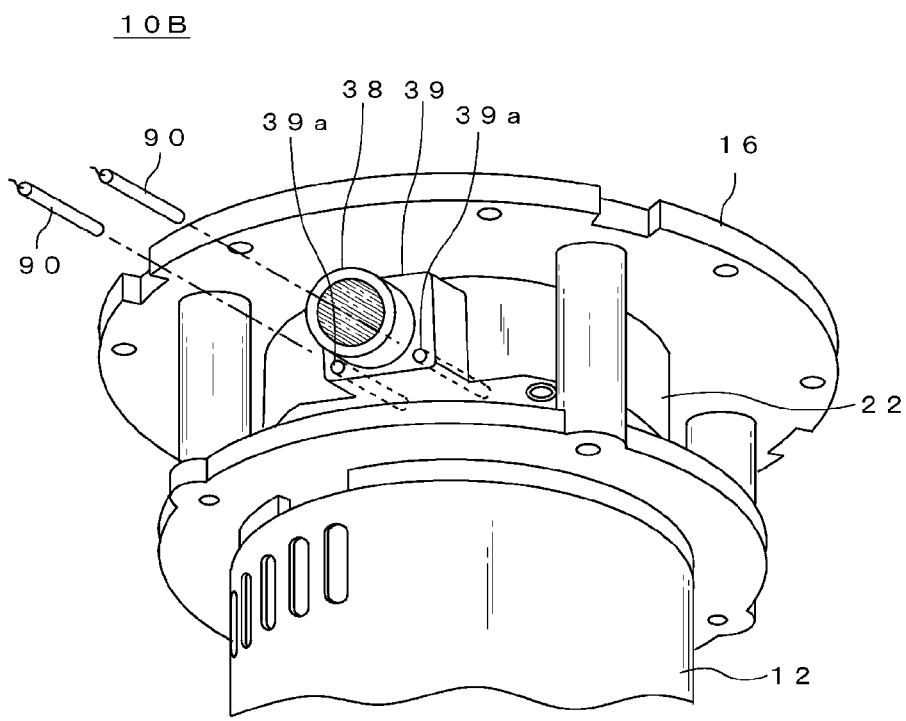
[FIG. 14] is a diagram for illustrating a heater for heating the flux.

As shown in FIGS. 13 and 14, a heater-attaching portion 39 for attaching heaters 90 each for heating the flux is provided at the drain pipe 38 constituting the flux collection apparatus 10B on a side of the discharge port 46. The heater-attaching portion 39 is a part enlarged from the outer diameter of the drain pipe 38 and heater-inserting holes 39a, 39a into which the heaters 90 for heating the flux are inserted are respectively formed on lower corners of a rectangular outer surface thereof.

Each of the heaters 90 for heating the flux is composed of so-called cartridge heater having a rod shape and is inserted into the heater-inserting hole 39a to heat the drain pipe 38 and the pipe 48 from the underside of drain pipe 38. Although, in this embodiment, two heaters 90 for heating the flux have been used, one heater 90 for heating the flux may be used or three heaters 90 for heating the flux may be used. Attached positions of the heaters 90 for heating the flux are not limited to the lower corners of the heater-attaching portion 39: they may be upper portions of the heater-attaching portion 39 or right and left portions of the heater-attaching portion 39. A wire is connected to an outer end of each of the heaters 90 for heating the flux and a power supply portion 200 is connected to the other end of the wire. As the power supply portion 200, a commercial power supply of 200V is used.

A control portion, not shown, permits the heaters 90 for heating the flux to be turned on, for example, at the same time when a power supply of the reflow furnace 100A is turned on to heat the drain pipe 38 and the pipe 48. Heating the drain pipe 38 and the pipe 48 allows the flux in the drain pipe 38 and the pipe 48 to be heated, thereby preventing the flux from stagnating and/or accumulating on the way in the path to the collection container 34. It is to be noted that a temperature control by the heaters 90 for heating the flux may be any intermittent control such that the heating is carried out for a fixed period of time and then, it stops or may be a control such that by a temperature sensor, temperature of the drain pipe 38 and the like is measured and the heaters 90 for heating the flux are turned on or off based on a result of the measured temperature. The temperature of each of the heaters 90 for heating the flux may be made different from each other based on a species of the flux to be used. Further, since components of the flux generated in the preheating zone Z1 and the main heating zone Z2 are different from each other, the temperature may be controlled to be made different from each other in the respective zones.

As described above, according to the second embodiment, since the heaters 90 for heating the flux are set up at the drain pipe 38, temperature of which drops remarkably after the heaters 72 and the fans 74 have stopped, it is possible to prevent the surrounding temperature of the drain portion 20 and/or the drain pipe 38 from dropping surely. This enables the stagnation (clogging) of the flux based on viscosity lowering therein to be successfully prevented. This also enables the flux to be smoothly and surely flown to be contained in the collection container 34. As a result thereof, since a period of operation time for the detachment operation of each of the parts such as the motors 12, the cleaning operation or the like based on fixation of the flux F can be reduced, it is possible to improve productivity thereof greatly.

<3. Third Embodiment>

A flux collection apparatus 10C according to the third embodiment is different from the first embodiment in which the drain portion 20 is provided at a center of the motor base in that the drain portions 20 are provided at a periphery of the motor base. It is to be noted that since other configuration of the flux collection apparatus 10C is the same as that of the flux collection apparatus 10A described in the above-mentioned first embodiment, the same signs are affixed to common components, detailed descriptions of which will be omitted.

Figure 15:
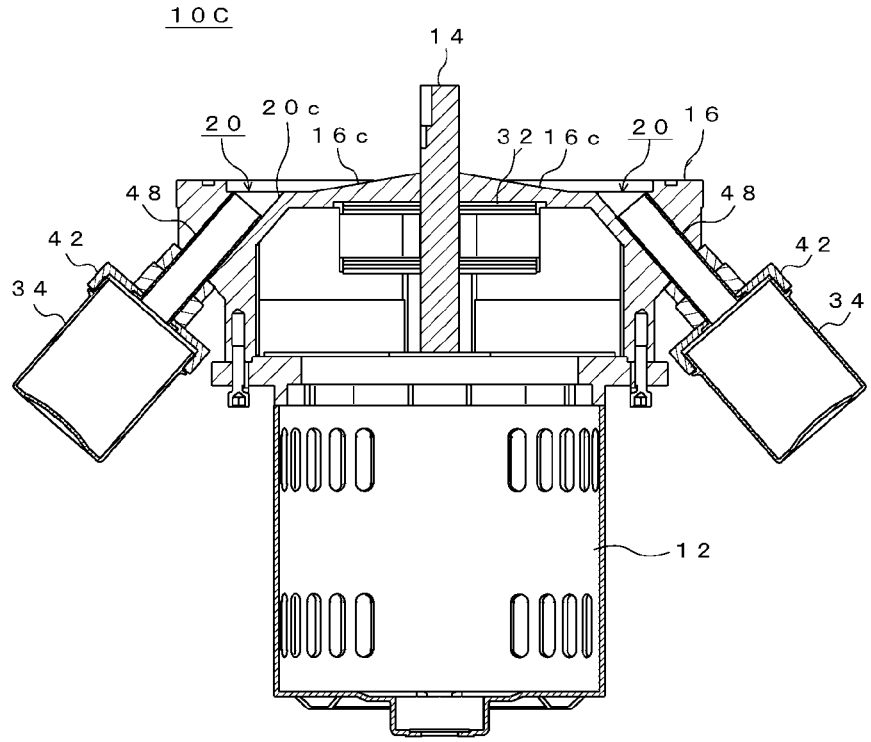
[FIG. 15] is a diagram showing a configuration example of a flux collection apparatus according to a third embodiment of the invention.
Figure 16:
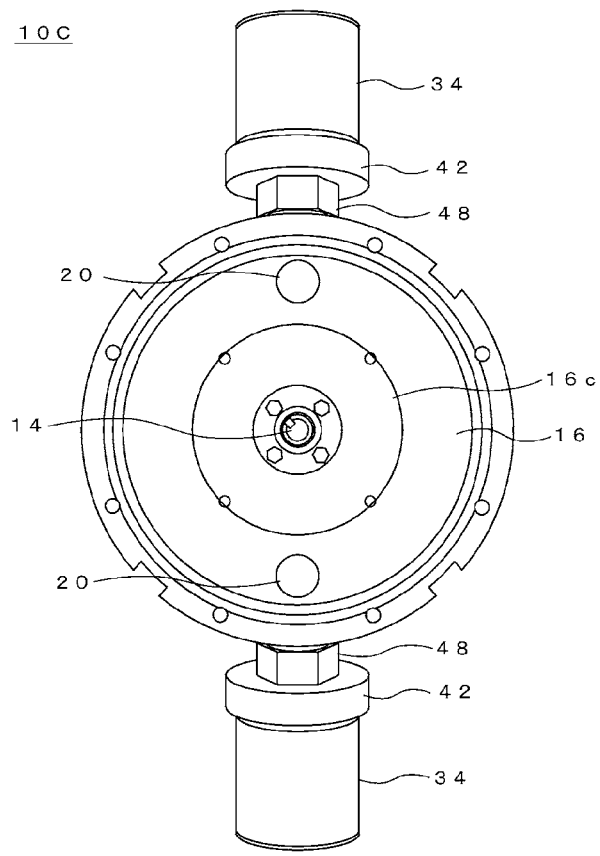
[FIG. 16] is a top view of the flux collection apparatus for showing the configuration example thereof.

As shown in FIGS. 15 and 16, the drain portions 20 constituting the flux collection apparatus 10C are formed so as to be passed through the motor base 16 outward and obliquely to the lower from the periphery of the upper surface (a surface which faces the fan 74) of the motor base 16. In this embodiment, the drain portions 20 are provided at two positions and these drain portions 20, 20 are positioned at the opposite positions on the periphery of the motor base 16. The upper surface of the motor base 16 is formed as an inclined surface 16c, which is inclined from a center portion of the motor base 16 toward the drain portions 20 positioned outside. Accordingly, the liquefied flux is flown outside along the inclined surface 16c and flown into the drain portions 20 so that it is discharged into the collection containers 34, each of which will be described later.

Figure 17:
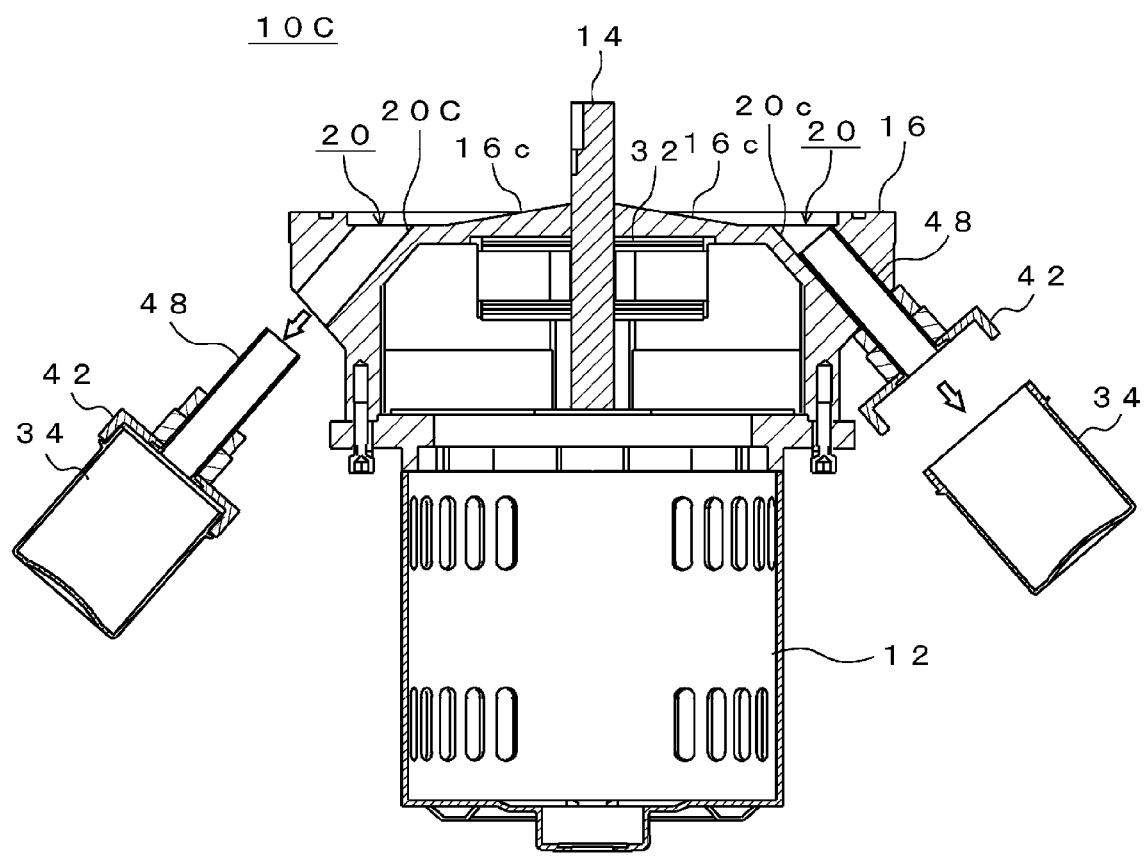
[FIG. 17] is a diagram for showing an operation example of maintenance at a normal case and an abnormal case.

As shown in FIG. 17, the pipe 48 is connected with each of the drain portions 20. Of the pipe 48, an outer diameter is selected so as to become almost the same as an inner diameter of each of the drain portions 20 so that it is configured so as to be detachably inserted into each of the drain portions 20. A length of the pipe 48 along a longitudinal direction thereof is selected so as to become longer than a length of each of the drain portions 20 along longitudinal directions thereof and when inserting the pipe 48 into each of the drain portions 20, a forward end of the pipe 48 extends up to a near position of an inflow port 20C of each of the drain portions 20. A spiral groove is formed on an outer circumferential portion of the forward end of the pipe 48 and it can be fixed and attached to each of the drain portions 20 by screwing the pipe 48 into a spiral groove formed inside each of the drain portions 20. On the other end of the pipe 48, a container cap 42 functioning as a cover of the collection container 34, which will be described later, is provided. A spiral groove corresponding to the spiral groove of the collection container 34 is formed on an inner circumferential surface of the container cap 42.

Each of the collection containers 34 is connected with each of the drain portions 20 through the pipe 48 and contains the flux flown through each of the drain portions 20 and the pipe 48. On a periphery of an upper end of each of the collection containers 34, the spiral groove is formed and it is possible to attach each of the collection containers 34 detachably to the pipe 48 by fitting each of the collection containers 34 to the spiral groove formed on the container caps 42 thereof. Such a collection container 34 is selected so as to have a size such that an operator can be easily detached and a certain amount of flux can be contained. Further, the collection container 34 may be made of transparent material so as to be ready to check an amount of the flux collected in the collection container 34.

As described above, according to the third embodiment, it is possible to obtain effects that are the same as those of the first embodiment. Namely, since the drain is configured to have an overlap structure of each of the drain portions 20 and the pipe 48, it is possible to clean an interior of the pipe 48 easily outside the reflow furnace 100A by detaching the inner pipe 48 from each of the drain portions 20 even when the flux stagnates (stops) on the way to the discharge path. Further, since the flux does not remain in each of the drain portions 20, it is possible to prevent the flux from stopping surely.

Figure 18:
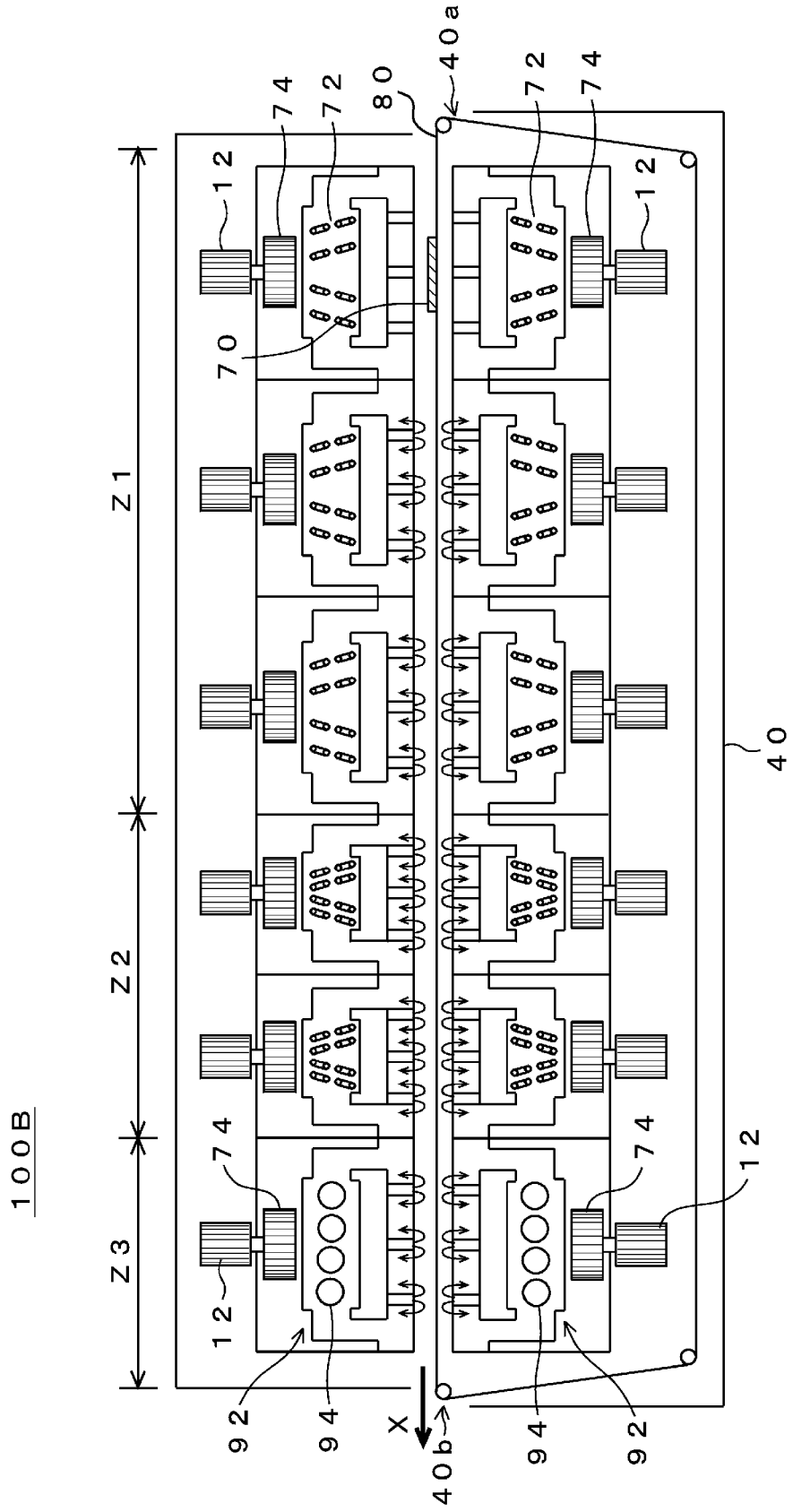
[FIG. 18] is a diagram showing a configuration example of a reflow furnace according to a fourth embodiment of the invention.

<4. Fourth Embodiment>
[Configuration Example of Reflow Furnace]
FIG. 18 shows a configuration example of a reflow furnace 100B according to the invention. The reflow furnace 100B according to this invention is provided with the reflow furnace main body 40 and the conveyor 80. The reflow furnace main body 40 is a housing extending like a tunnel and having the receiving entrance 40a and the discharging exit 40b. The conveyor 80 extends along the conveying path X from the receiving entrance 40a to the discharging exit 40b and conveys the printed circuit board 70 at a desired speed from the receiving entrance 40a to the discharging exit 40b in the reflow furnace main body 40.

In an interior of the reflow furnace main body 40, the preheating zone Z1, the main heating zone Z2 and the cooling zone Z3 are provided in order along the conveying path X. The preheating zone Z1 is an area for volatilizing any solvent contained in the solder paste and the heaters 72, the fans 74, the motors 12 and the like are provided therein. As the solder paste, lead-free solder containing, for example, tin-silver-copper, tin-zinc-bismuth and the like is used. This fused solder has a melting point of, for example, about 180 degrees Celsius through 220 degrees Celsius. The main heating zone Z2 is an area for melting the solder by heating the printed circuit board 70 and the heaters 72, the fans 74, the motors 12 and the like are provided therein. It is to be noted that although same configurations of the heaters 72, the fans 74 and the motors 12 are generally used in the preheating zone Z1 and the main heating zone Z2 and they are different from each other in only the temperature setting, their different configurations may be used. Even when their different configurations are adopted, their basic configurations and functions are identical, descriptions of which will be omitted.

The heaters 72 are respectively positioned above and below the conveyor 80 so that they are opposite to each other and heat air within the preheating zone Z1 and the main heating zone Z2. In this embodiment, as shown in FIG. 18, three heaters 72 are respectively positioned above and below it in the preheating zone Z1 and two heaters 72 are respectively positioned above and below it in the main heating zone Z2.

The motors 12 are respectively positioned above and below the conveyor 80 so that they are opposite to each other and drive the rotation of fans 74 positioned in each zone. In this embodiment, as shown in FIG. 18, three motors 12 are respectively positioned above and below it in the preheating zone Z1 and two motors 12 are respectively positioned above and below it in the main heating zone Z2.

Each of the fans 74 is composed of, for example, a turbo fan, a sirocco fan or the like and is electrically connected to each of the motors 12. Each of the fans 74 rotates by the driving of each of the motors 12 to allow the heated wind which is heated by the heaters 72 to be circulated in the preheating zone Z1 and the main heating zone Z2 and to be blown onto an upper surface and a lower surface of the printed circuit board 70, respectively. In this embodiment, three fans 74 are respectively positioned above and below the conveyor in the preheating zone Z1 and two fans 74 are respectively positioned above and below it in the main heating zone Z2.

Figure 19:
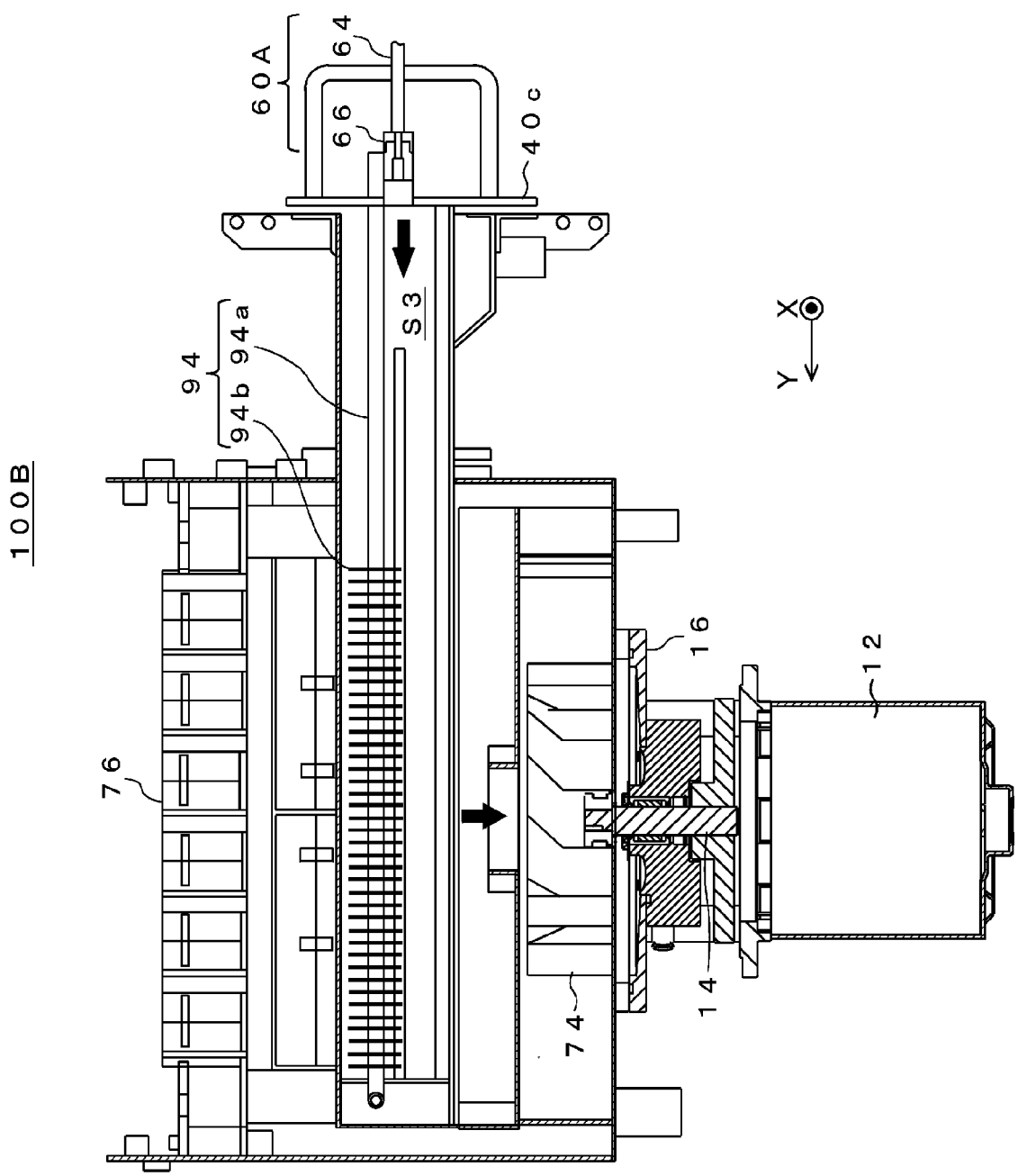
[FIG. 19] is a diagram showing a configuration example of a cooling zone (part one).

[Configuration Example of Cooling Zone]
Next, the following will describe a configuration example of the cooling zone Z3. It is to be noted that in the following description, the configuration of the cooling zone Z3 which is provided at the lower side of the reflow furnace main body 40 will be described. FIG. 19 shows a sectional view of the cooling zone Z3 in the reflow furnace main body 40 taken along a direction which is perpendicular to the conveying path X and FIG. 20 shows a sectional view of the cooling zone Z3 taken along the conveying path X.

Figure 20:
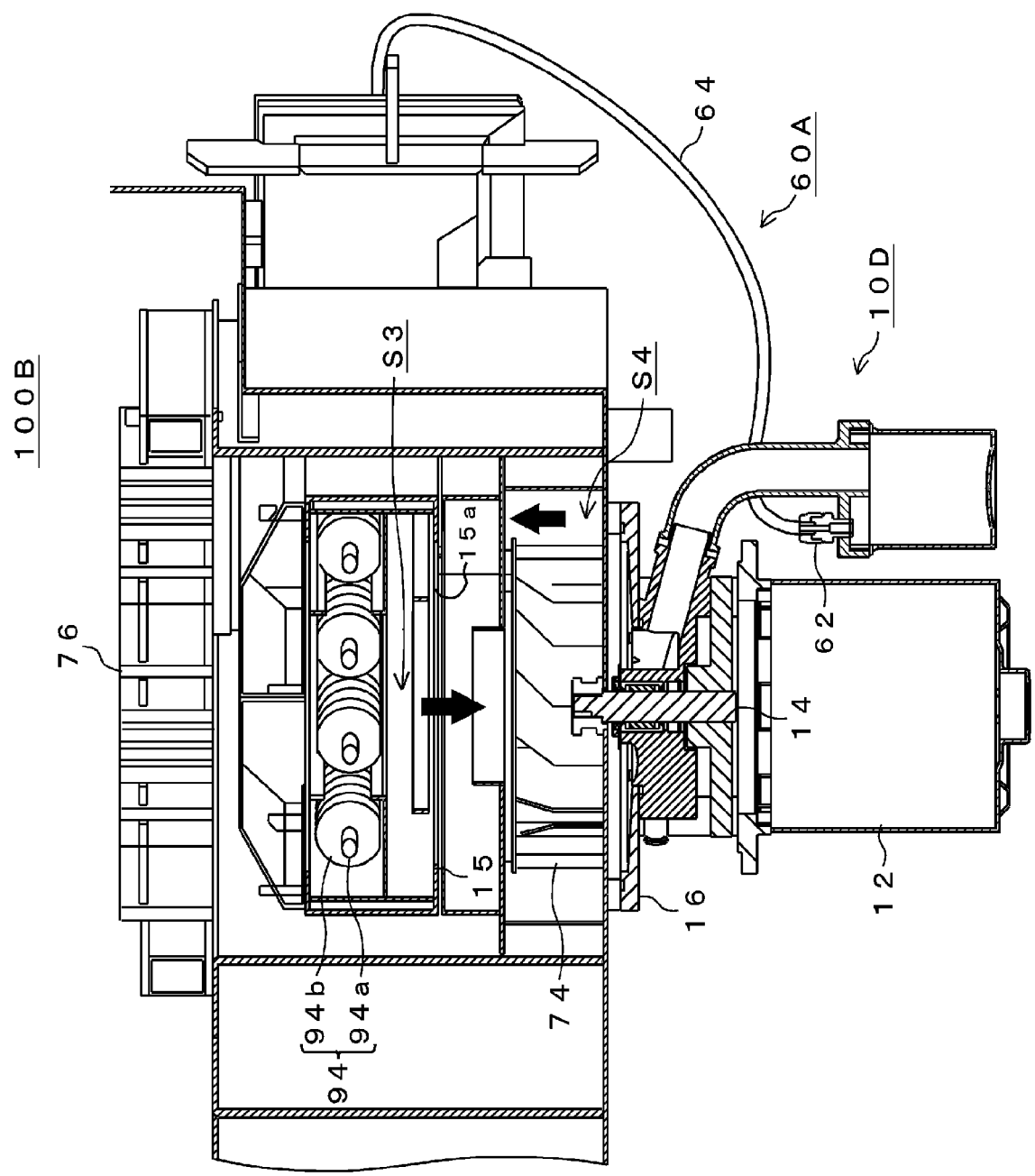
[FIG. 20] is a diagram showing a configuration example of the cooling zone (part two).

As shown in FIGS. 18 through 20, the cooling zone Z3 of the reflow furnace main body 40 is an area for cooling the printed circuit board 70 which has been heated in the main heating zone Z2 and solidifying the molten solder. In the cooling zone Z3, a cooler 92 equipped with cooling members 94, the fan 74, the motor 12 and the flux collection apparatus 10D are provided. In the cooling zone Z3 in which these members are positioned, an inlet S3 and an outlet S4, which are partitioned by a plurality of partitions, are respectively and independently provided. The inlet S3 is a space for supplying air taken-in from intake holes formed on nozzles 76 to the fan 74 as shown in FIGS. 19 and 20. The outlet S4 is a space for supplying air blown off from the fan 74 to blow-off holes formed on the nozzles 76 as shown in FIG. 20.

Each of the cooling members 94 is positioned in the inlet S3 below the nozzles 76 and cools gas taken-in from the intake holes of the nozzles 76. Each of the cooling members 94 is composed of a cooling pipe 94a extending along Y direction which is perpendicular to the conveying path X and a plurality of fins 94b each having a disk shape which is attached to the cooling pipe 94a along a longitudinal direction thereof. In this embodiment, as shown in FIG. 20, four cooling members 94 are provided along the conveying path X so that they stand side by side with a predetermined space. A horizontal plate 15 is provided between the cooling members 94 and the fan 74. On almost a center of this horizontal plate 15 (on a front of the fan), an inflow port 15a for supplying the air cooled by the cooling members 94 to the fan 74 which is positioned below is formed. The cooling pipe 94a has, for example, a pipe shape and the pipe itself is cooled by passing a coolant such as water or air through the pipe.

The fan 74 is composed of, for example, a turbo fan, a sirocco fan or the like and is positioned below the inflow port 15a of the horizontal plate 15. The fan 74 rotates by the driving of the motor 12 via the rotation axis 14 to allow the air cooled by the cooling members 94 to be blown onto a lower surface of the printed circuit board 70. On a partition wall, not shown, positioned at a side direction of the fan 74, an outflow port, not shown, for supplying the cooled air taken-in by the fan 74 to the outlet S4 is formed.

The motor 12 is attached to an outer surface portion of a casing constituting the reflow furnace main body 40 and drives the rotation of the fan 74 via the rotation axis 14. In this embodiment, as shown in FIG. 18, units of one fan 74, motor 12 and the cooling members 94 are respectively positioned upper and below in the cooling zone Z3. It is to be noted that the motor 12 constitutes the driving portion.

Figure 21:
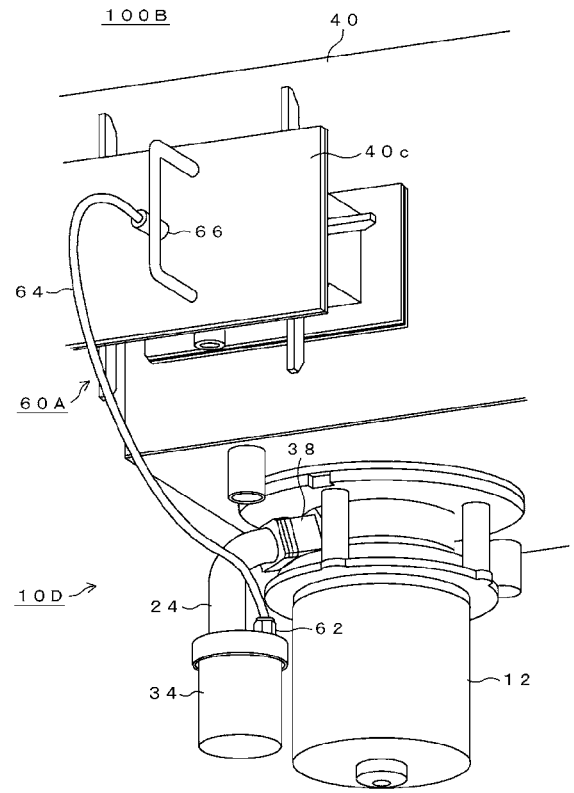
[FIG. 21] is a perspective view of a decompression portion for showing a set example thereof.
Figure 22:
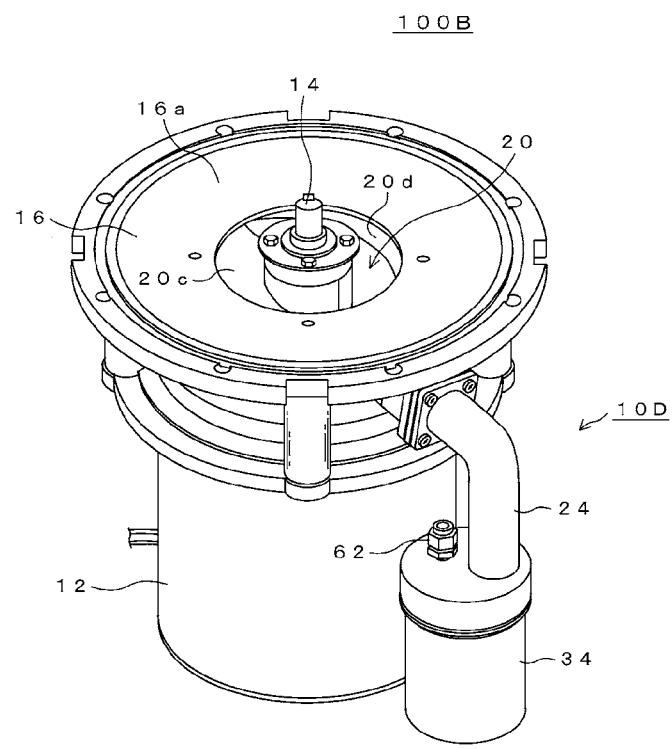
[FIG. 22] is a perspective view of a flux collection apparatus for showing a configuration example thereof.
Figure 23:
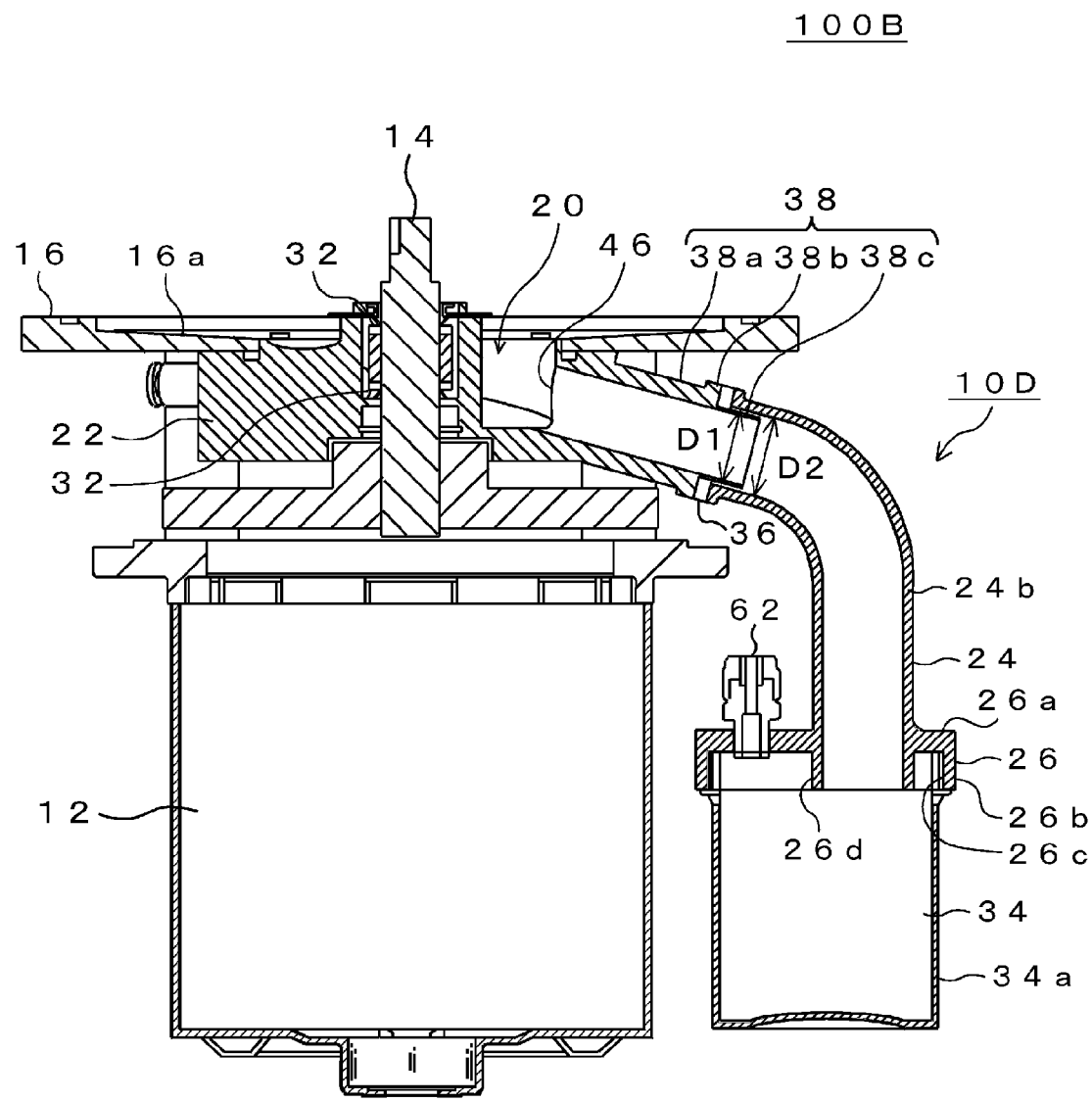
[FIG. 23] is a sectional view of the flux collection apparatus for showing a configuration example thereof.
Figure 24:
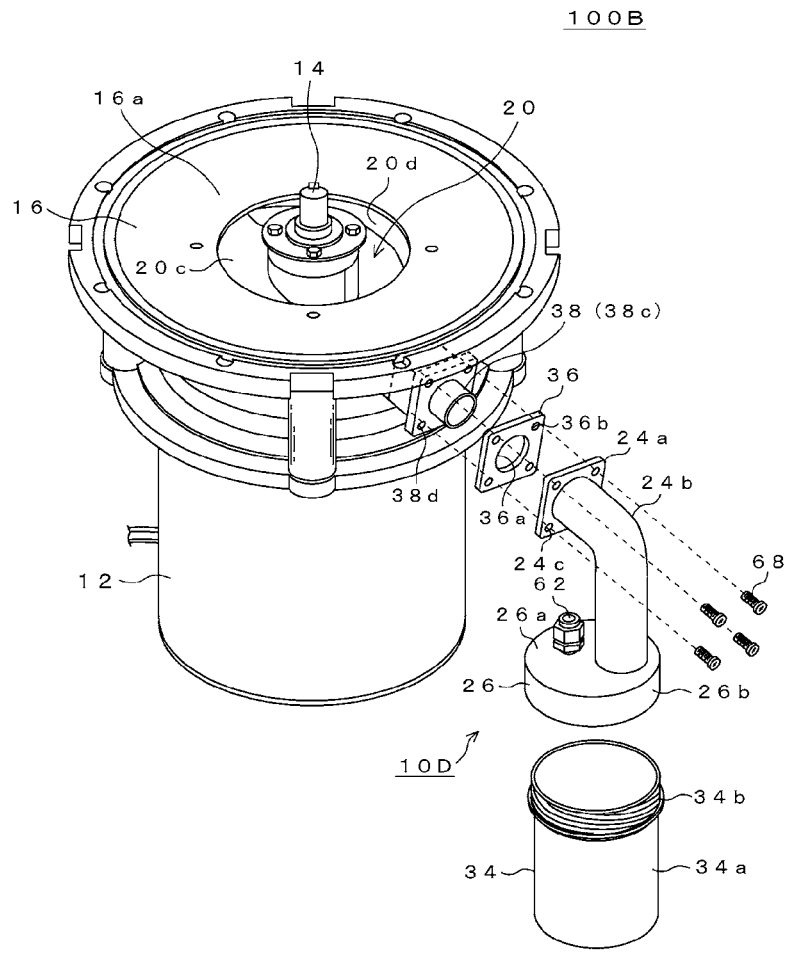
[FIG. 24] is an exploded perspective view of the flux collection apparatus for showing a configuration example thereof.
Figure 25:
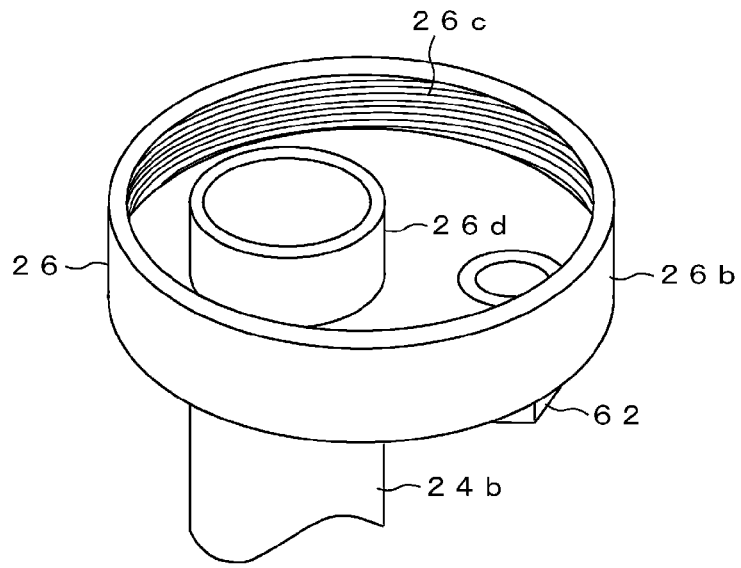
[FIG. 25] is a diagram showing a configuration example of a cap portion of a discharge pipe.

The following will describe a configuration example of the flux collection apparatus 10D which is provided on an outer surface side of a casing constituting the cooling zone Z3. FIG. 21 is a perspective view of the flux collection apparatus 10D for showing a set example thereof. FIG. 22 is a perspective view of the reflow furnace 100B containing the flux collection apparatus 10D for showing a configuration example thereof. FIG. 23 is a sectional view thereof and FIG. 24 is an exploded perspective view thereof. FIG. 25 shows a configuration example of a cap portion 26 constituting the discharge pipe 24. It is to be noted that since the liquid flux accumulated on the motor base 16 flows downward by its weight, the flux collection apparatus 10D is basically positioned only below the conveyor 80 of the reflow furnace 100B shown in FIG. 18.

As shown in FIGS. 21 through 25, the flux collection apparatus 10D is provided with a motor base 16, a drain portion 20, a drain pipe 38, a discharge pipe 24, a collection container 34 and a decompression portion 60A. The motor base 16 has a disk shape having an outer diameter that is slightly larger than that of the fan 74 and is made of metallic material such as stainless steel (SUS) or aluminum which is excellent at corrosion resistance and thermal resistance. The motor base 16 is a member which supports the motor 12, which will be described later, and is an example of the base member. On a surface of the motor base 16, which faces the fan 74, the inclined surface 16a inclined so that a height of the plane portion thereof falls from the periphery thereof to the rotation axis 14 (a center portion thereof) is formed. Since the drain portion 20 is formed around the rotation axis 14, which will be described later, it is possible to flow the flux accumulated on the motor base 16 to the drain portion 20 efficiently by the inclined surface 16a.

On a back side of the motor base 16 (a side thereof opposite to the fan 74), the motor 12 is attached through the center drain block 22. The motor 12 is connected with, for example, a commercial power supply portion, not shown, and drives the rotation of the fan 74 through the rotation axis 14 based on an instruction from a control apparatus, not shown.

A seal member 32 for preventing flux fume or the open air (the air) from being come into a clearance between the rotation axis 14 and the central drain block 22 is inserted between an outer circumferential surface of the rotation axis 14 and an inner circumferential surface of the central drain block 22. As the seal member 32, for example, any contact type seal member such as oil seal, V packing and Teflon (registered trademark) seal, any contactless type seal member (for example, labyrinth seal) and the like are used. In this embodiment, a case where V packing and Teflon (registered trademark) seal are used is shown.

The drain portion 20 drains the flux accumulated on the motor base 16 from the motor base to outside. This drain portion 20 is composed of a groove (a hollow portion) and is provided around a circumferential direction of the rotation axis 14 positioned at a center of the motor base 16. Forming the drain portion 20 at the center portion of the motor base 16 is because it is taken into a consideration that the flux is collected on the center portion (the rotation axis 14) of the motor base 16 by any wind generated when the fan 74 rotates and blown toward the center. This drain portion 20 has an inclined surface 20c, as shown in FIG. 22, which is inclined from a level position of the motor base 16 to a drain pipe 38 (a discharge port 46) provided at a back side of the motor base 16. On the wall portion 20d positioned at a downstream side of the inclined surface 20c of the drain portion 20, the discharge port 46 for discharging the flux flown into the drain portion 20 to outside is formed, as shown in FIG. 23.

The drain pipe 38 is communicated with the discharge port 46 formed on the drain portion 20 as shown in FIGS. 23 and 24 and supplies the flux flown into the drain portion 20 to the collection container 34. This drain pipe 38 has a drain pipe main body 38a, a flange portion 38b and an insert portion 38c. The drain pipe main body 38a extends obliquely to the lower from the discharge port 46 and leads the flux discharged from the discharge port 46 of the drain portion 20 to the discharge pipe 24 of later stage. The insert portion 38c has a cylinder shape and projects from a forward end of the drain pipe main body 38a. By selecting an outer diameter D1 thereof so as to be smaller than an inner diameter D2 of the discharge pipe 24, the insert portion 38c may be detachably inserted into the discharge pipe 24. This enables the insert portion 38c to be inserted into an upper entrance of the discharge pipe 24 deeply. The flange portion 38b is provided on a base of the insert portion 38c so as to extend outward and is configured as to be rectangular, shown from a plane thereof, corresponding to a shape of a packing 36, which will be described later. Screw holes 38d for attaching the discharge pipe 24 are respectively formed on four corners of the flange portion 38b as shown in FIG. 24.

The discharge pipe 24 has a flange portion 24a, a discharge pipe main body 24b and a cap portion 26 as shown in FIGS. 23 and 24. The discharge pipe main body 24b extends at an upper side thereof obliquely to the lower along a direction in which the drain pipe main body 38a extends and bends down on a vertical direction thereof at a position thereof which is slightly upper than a middle portion thereof on the longitudinal direction thereof to extend by a predetermined length. The flange portion 24a is provided on an end of the discharge pipe main body 24b at a side of the drain pipe 38 so as to extend outward and is configured as to be rectangular, shown from a plane thereof, corresponding to a shape of the packing 36, which will be described later. Screw holes 24c for allowing it to be attached on the drain pipe 38 are respectively formed on four corners of the flange portion 24a as shown in FIG. 24.

The cap portion 26 functions as a cap of the collection container 34, which will be described later, and is attached to a lower end portion of the discharge pipe main body 24b. As shown in FIGS. 23 through 25, this cap portion 26 has a top surface portion 26a with a diameter that is almost the same as an outer diameter of the collection container 34 and a side wall portion 26b formed on a periphery of the top surface portion 26a. A spiral groove 26c corresponding to a spiral groove 34b of the collection container 34 is formed on an inner circumferential surface of the side wall portion 26b as shown in FIG. 25. A cylinder like projection portion 26d which is communicated with the discharge pipe main body 24b and projects to a vertical direction is provided on an inner surface side of the top surface portion 26a. This projection portion 26d functions as bulwarks for preventing the flux flown into the collection container 34 from the discharge pipe 24 from being solidified on an inner surface of the top surface portion 26a and/or the spiral groove 26c of the side wall portion 26b.

The collection container 34 constitutes an example of the flux collection portion. The collection container 34 is connected with the drainpipe 38 through the discharge pipe 24 and contains the flux flown through the drain portion 20, the discharge port 46, the drain pipe 38 and the discharge pipe 24. The collection container 34 is provided with a cylinder like container main body 34a, an upper end of which is open and a lower end of which is a bottom. On a periphery of the upper end of this collection container main body 34a, the spiral groove 34b is formed around its circumferential direction. It is possible to attach the collection container 34 detachably to the discharge pipe 24 by screwing the spiral groove 34b to the spiral groove 26c of the cap portion 26. This collection container 34 is selected so as to have a size such that an operator can detach it easily and a certain amount of flux can be contained therein. Further, the collection container 34 may be made of transparent material so as to be ready to check an amount of the flux collected in the collection container 34. Since the collection container 34 is attached to an end of the discharge pipe 24 extending on the vertical direction, an attached angle thereof is also the vertical direction. This enables an amount of contained flux to be increased as compared with, for example, a case where the collection container 34 is obliquely attached.

Screws 68 are fastened on the respective screw holes corresponding to the screw holes 24c of the flange portion 24a of the discharge pipe 24, screw holes 36b of the packing 36 and the screw holes 38d of the flange portion 38b of the drain pipe 38, as shown in FIG. 24, thus configured, and the discharge pipe 24 is detachably attached to the drain pipe 38 through the packing 36.

The decompression portion 60A decompresses the collection container 34 to collect the flux into the collection container 34 by drawing it. As one example of means for decompressing the collection container 34, as shown in FIG. 20, the decompression portion 60A which is communicated with the collection container 34 is provided in the inlet S3 under negative pressure in the cooling zone Z3 (see FIGS. 19 and 20) to allow the pressure with on the collection container 34 to be reduced when by the rotation driving of the fan 74, a rear surface of the fan 74, the drain pipe 38, the discharge pipe 24 and the collection container 34 are put under pressure. This decompression portion 60A is composed of a container side connection portion 62, a connecting tube 64 and a main body side connection portion 66. The container side connection portion 62 is attached to a position of an outer surface of the top surface portion 26a of the cap portion 26, which is not conflicted with the position of the discharge pipe 24, and is communicated with an interior of the collection container 34 through the cap portion 26. The main body side connection portion 66 is attached to a side wall portion 40c of a casing constituting the cooling zone Z3 of the reflow furnace main body 40 and is communicated with the inlet S3 of the cooling zone Z3 through this side wall portion 40c. Of the connecting tube 64, an end is connected with the container side connection portion 62 and the other end is connected with the main body side connection portion 66.

<Operation Example of Reflow Furnace>

Next, the following will describe an operation example of the reflow furnace 100B adopting the above-mentioned decompression portion 60. The following will describe the cooling zone Z3 in detail. When a power supply of the reflow furnace 100B is turned on, the conveyor 80 and the fans 74 are driven and the heaters 72 are also turned on. Nitrogen is injected into the reflow furnace main body 40 in order to reduce the oxygen concentration in the reflow furnace main body 40.

When the rotation of the fans 74 are driven by the driving of the motors 12, a flow flown to an intake direction occurs on a front side of each of the fans 74. Thus, the inlet S3 is under negative pressure. Accordingly, the air taken-in from the intake holes formed on the nozzles 76 is taken in the inlet S3 and the air thus taken-in is passed through the cooling members 94 positioned below the nozzles 76 so as to be cooled. The cooled air is supplied to the fans 74 through the inflow port 15a. The cooled air which supplied to the fans 74 blows off from sides of each of the fans 74 and blows off from the blow-off holes formed on the nozzles 76 through the outlet S4. Accordingly, the cooled air is blown to the lower surface side on the printed circuit board 70 so that the printed circuit board 70 is cooled. The cooled air blown to the lower surface side on the printed circuit board 70 takes away heat of the printed circuit board 70 so that its temperature rises. This temperature-risen gas is again taken in from the intake holes of the above-mentioned nozzles 76 and is cooled by the cooling members 94 and supplied to the fans 74. In the cooling zone Z3, such a circulation of gas are repeated and the printed circuit board 70 conveyed by the conveyor 80 is cooled.

On the other hand, when the rotation of the fans 74 is driven, any pressure is applied to a back side of each of the fans 74. Since a space between each of the fans 74 and the motor base 16 is communicated to the drain pipe 38, the discharge pipe 24 and the collection container 34, their interiors also become under pressure. In this moment, since a seal between the rotation axis 14 and the center drain block 22 of the fan 74 is performed by the seal member 32, a space of the back side space of each of the fans 74 and the interiors of the drain pipe 38, the discharge pipe 24 and the collection container 34, which have been described above, become under high pressure. Further, since the cooling zone Z3 has a low environmental temperature, viscosity of the flux is more increased than those in the preheating zone Z1 and the main heating zone Z2. Accordingly, a flow of pressured (gas) stagnates, which prevents the flux from being flown.

In this invention, a connection between the collection container 34 and the inlet S3 of the cooling zone Z3 is performed by the connecting tube 64. This enables the pressure in a side of the collection container 34 to be reduced so that the flux is drawn in, thereby allowing the flux accumulated on the motor base 16 to be contained into the collection container 34.

As described above, according to the fourth embodiment, since the pressure at a side of the collection container 34 is decompressed by performing a connection between the collection container 34 and the inlet S3 of the cooling zone Z3 by the connecting tube 64, it is possible to prevent the flux from being stagnated on the inclined surface 16a. As a result thereof, since re-evaporation of the flux stagnated on the motor base 16 and a contamination or a drip of the stagnated flux can be avoided, it is possible to shorten a period of maintenance time for the reflow furnace 100B.

In regard to this, according to the reflow furnace 100B of this invention, since the discharge pipe 24 at a side the collection container 34 extends on the vertical direction so that an attached angle of the collection container 34 to be attached to this discharge pipe 24 can be also the vertical direction, it is possible to increase an amount of containable flux as compared with, for example, that of a case where the collection container 34 is obliquely attached. This enables a collection frequency of the flux in the collection container 34 to be decreased, so that it is possible to shorten a period of maintenance time by a user.

Further, since the drain pipe 38 is provided with the insert portion 38c and the insert portion 38c is inserted into the discharge pipe 24 to come into an upper entrance of the discharge pipe 24 deeply, it is possible to prevent the flux from coming into a space between an outer circumferential surface of the drain pipe 38 and an inner circumferential surface of the discharge pipe 24 surely. Accordingly, it is possible to prevent the flux from being solidified at the connected portion of the drain Pipe 38 and the discharge pipe 24. Further, even if the flux is solidified, the flux is solidified inside the drainpipe 38 so that it is possible to detach the discharge pipe 24 attached to an outer side of the drain pipe 38 from the drain pipe 38 easily. As a result thereof, it is possible to reduce a burden for the maintenance operation and to shorten a period of maintenance operation time.

<5. Fifth Embodiment>

The fifth embodiment is different from the fourth embodiment in that a pressure within the collection container 34 is decompressed by force by using an ejector 50. It is to be noted that since other configuration of the reflow furnace 100C, the flux collection apparatus 10E and the like is the same as that of the reflow furnace 100B and the flux collection apparatus 10D described in the above-mentioned fourth embodiment, the same signs are affixed to common components, detailed descriptions of which will be omitted.

[Configuration Example of Decompression Portion]

Figure 26:
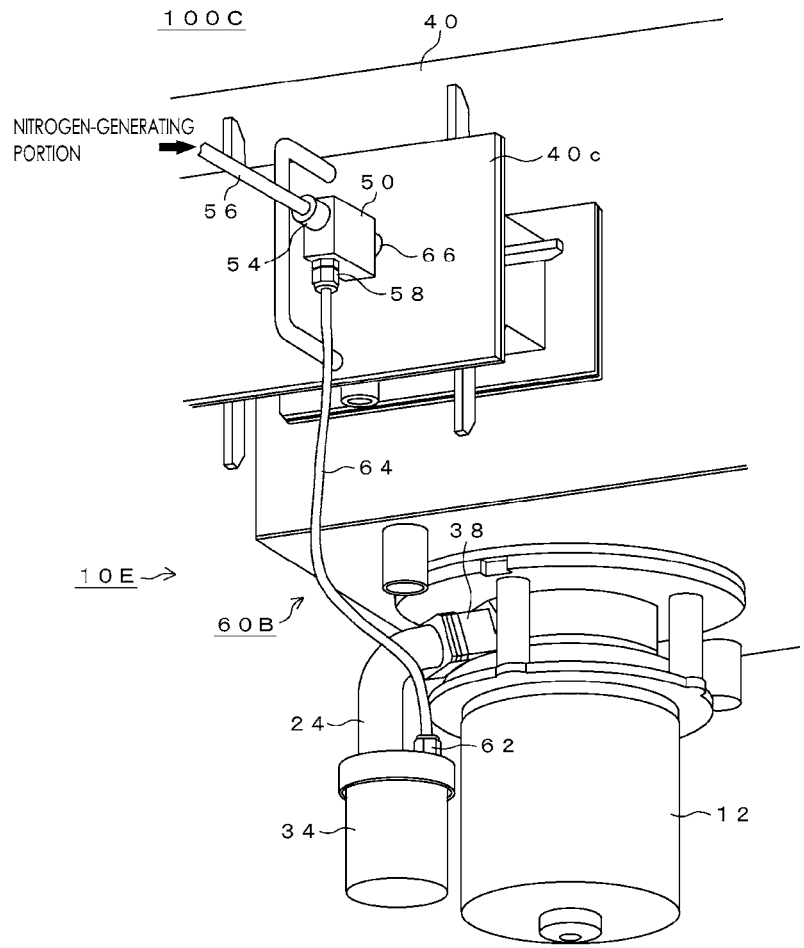
[FIG. 26] is a perspective view of a decompression portion of a reflow furnace according to a fifth embodiment of the invention for showing a set example thereof.

FIG. 26 shows a configuration example of the flux collection apparatus 10E in the cooling zone Z3 of the reflow furnace 100C adopting a decompression portion 60B which has the ejector 50. As shown in FIG. 26, the decompression portion 60B has the ejector 50, an ejector side connection portion 58, a container side connection portion 62, a connecting tube 64 and a main body side connection portion 66. The ejector 50 is a member for dragging the pressure on the side of the collection container 34 into the cooling zone Z3 by force by utilizing a phenomenon such that when gas is injected on a certain direction, a negative pressure occurs around a flow thereof.

Figure 27:
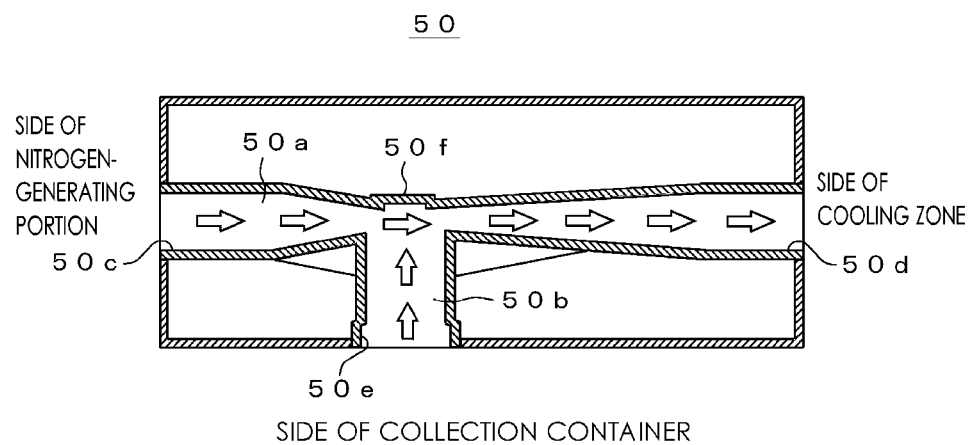
[FIG. 27] is a sectional view of an ejector constituting the decompression portion for showing a configuration example thereof.

FIG. 27 shows a configuration example of a section of the ejector 50. There are provided, in the interior of the ejector 50, a nitrogen-supplying path 50a extending horizontally and a drawing path 50b branched downward on the way to the nitrogen-supplying path 50a. An end of the nitrogen-supplying path 50a, which is opposite to the reflow furnace main body 40, is an entrance 50c and the other end thereof is an exit 50d. A lower end of the drawing path 50b is an intake port 50e. A recess portion 50f inwardly recessed is provided at a brunched portion of the nitrogen-supplying path 50a.

An end of the connecting tube 64 is connected with the intake port 50e of the ejector 50, as shown in FIGS. 26 and 27, through the ejector side connection portion 58 thereof. The other end of the connecting tube 64 is connected with the container side connection portion 62. This enables the interior of the collection container 34 to be communicated with the interior of the inlet S3 of the cooling zone Z3 through the connecting tube 64. To the entrance 50c of the ejector 50, an end of a nitrogen-supplying tube 56 is connected through a nitrogen-supplying portion 54. To the other end of the nitrogen-supplying tube 56, a nitrogen-generating portion, not shown, is attached. The exit 50d of the ejector 50 is connected with the side wall portion 40c of the cooling zone Z3 of the reflow furnace main body 40.

[Operation Example of Reflow Furnace]

Next, the following will describe an example of an operation of the reflow furnace 100C using the decompression portion 60B. When supplying the nitrogen generated in the nitrogen-generating portion to the ejector 50 through the nitrogen-supplying tube 56, the supplied nitrogen passes through the nitrogen-supplying path 50a in the ejector 50. In this moment, the nitrogen becomes high speed jet flow by the recess portion 50f provided on the way to the nitrogen-supplying path 50a so that the pressure falls down in place of increase of the flow. Namely, by such loss of the pressure, the drawing path 50b becomes under the negative pressure. Accordingly, the pressure (gas) which stays on a side of the collection container 34 is drawn into the drawing path 50b of the ejector 50 through the connecting tube 64 and is rapidly mixed into the nitrogen flown in the nitrogen-supplying path 50a at the brunched portion. The nitrogen and the gas on a side of the collection container 34, which have been mixed, are flown into the inlet S3 of the cooling zone Z3. Thus, in the fifth embodiment, by utilizing the negative pressure generated when the nitrogen is injected, an interior of the collection container 34 is decompressed so that the flux is drawn into the collection container 34 by force.

As described above, such a pressure equalization method of the fifth embodiment is suitably available for a case where drawing force of the pressure generated by directly connecting the collection container 34 and the cooling zone Z3 using the connecting tube 64, which has been described in the fourth embodiment, is short. In other words, by using the ejector 50, a large drawing force (negative pressure) by injection of the nitrogen enables the flux accumulated on the inclined surface 16a of the motor base 16 to be flown into the drain portion 20 and the flux to be drawn into the collection container 34 by force. As a result thereof, since it is possible to prevent the flux from stagnating on the inclined surface 16a, any re-evaporation of the flux stagnated on the motor base 16 and a contamination or a drip of the stagnated flux can be avoided so that it is possible to shorten a period of maintenance time for the reflow furnace 100C.

<6. Sixth Embodiment>

The sixth embodiment is different from the above-mentioned fourth embodiment in that the drain portions 20 are formed on two positions around a periphery of the motor base 16, not at a center of the motor base 16. It is to be noted that since other configuration of the reflow furnace 100D and the like, is the same as that of the reflow furnace 100B described in the above-mentioned fourth embodiment, the same signs are affixed to common components, detailed descriptions of which will be omitted.

Figure 28:
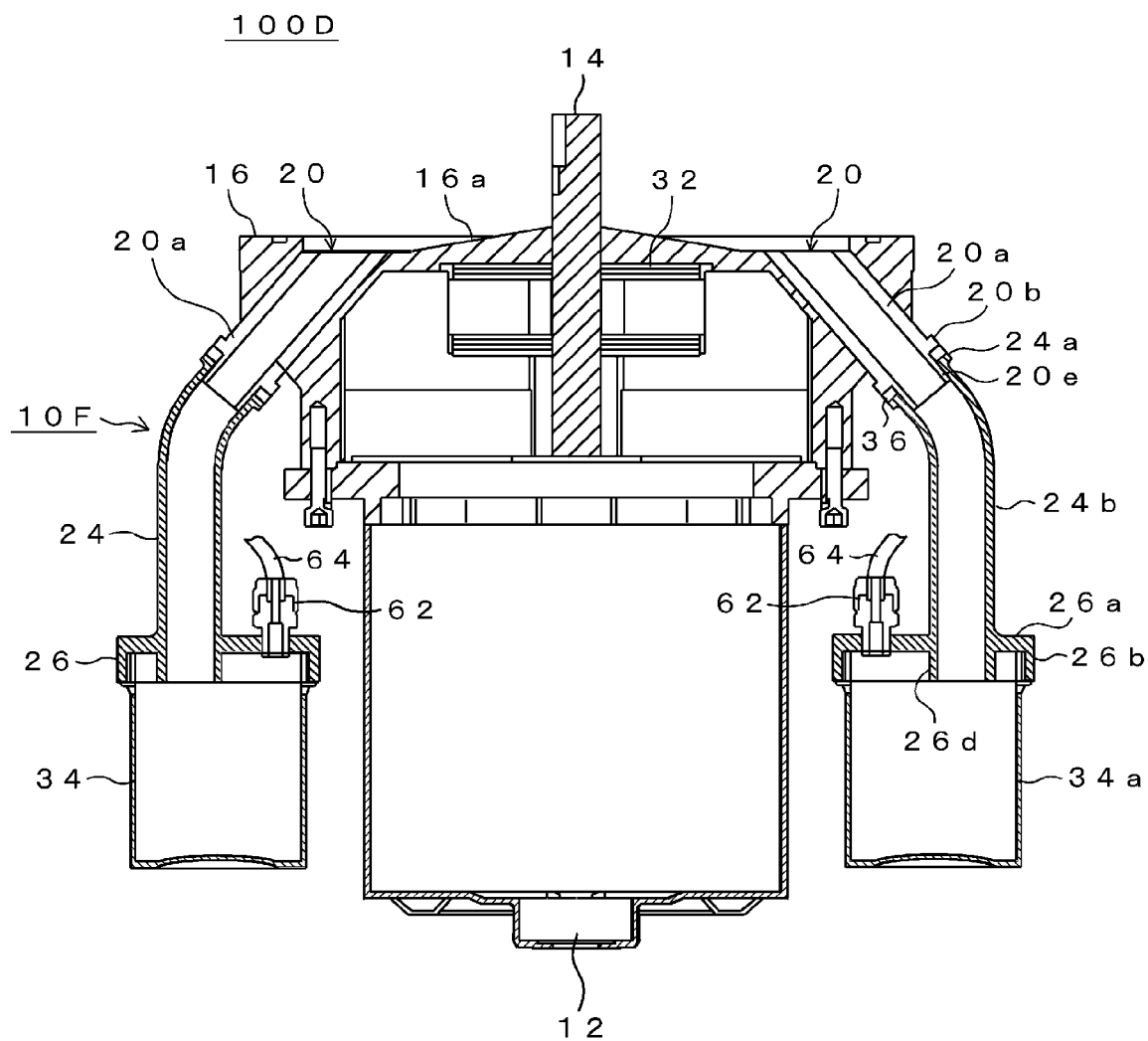
[FIG. 28] is a sectional view of a flux collection apparatus according to a sixth embodiment of the invention for showing a configuration example thereof.
Figure 29:
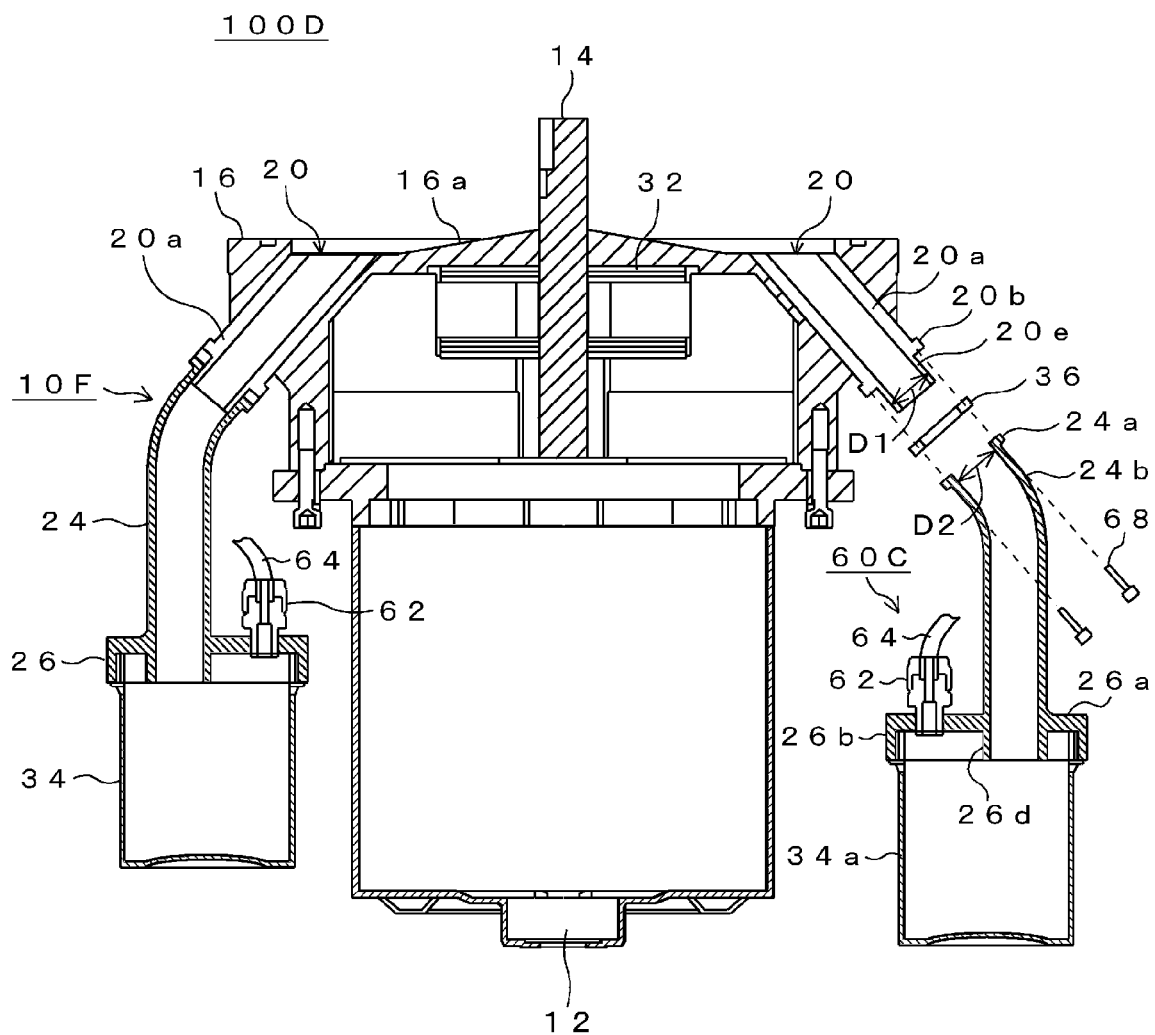
[FIG. 29] is an exploded sectional view of the flux collection apparatus for showing a configuration example thereof.

FIGS. 28 and 29 respectively show one configuration example of the flux collection apparatus 10F. As shown in FIGS. 28 and 29, the flux collection apparatus 1OF is provided with the motor base 16, the drain portions 20, the discharge pipes 24, the collection containers 34 and the decompression portions 60C.

Each of the drain portions 20 has a drain pipe 20a, a flange portion 20b and an insert portion 20e. The drain pipe 20a is formed so as to be passed through the motor base 16 outward and obliquely to the lower from the periphery of the upper surface of the motor base 16. In this embodiment, the drain portions 20 are provided at two positions and the openings at the upper ends of these drain portions 20, 20 are positioned at the opposite positions on the periphery of the motor base 16. The upper surface of the motor base 16 becomes an inclined surface 16a which is inclined from a center portion of the motor base 16 toward the drain portions 20 formed at the outer direction. Accordingly, the liquefied flux is flown outside along the inclined surface 16a and flown into the drain portions 20 so that it is discharged into the collection containers 34, each of which will be described later.

The insert portion 20e is provided at a forward end of the drain pipe 20a and, by selecting an outer diameter D1 thereof so as to be smaller than an inner diameter D2 of the discharge pipe 24, may be detachably inserted (connected) into the discharge pipe 24. The flange portion 20b is provided on a base of the insert portion 20e and is configured as to be rectangular, shown from a plane thereof, corresponding to a shape of the packing 36. Screw holes, not shown, for attaching the discharge pipe 24 are respectively formed on four corners of the flange portion 20b.

The discharge pipe 24 has a flange portion 24a, a discharge pipe main body 24b and a cap portion 26. The discharge pipe main body 24b extends at an upper side thereof obliquely to the lower along a direction in which the drain pipe 20a extends and bends down on a vertical direction thereof at a position which is slightly upper than a middle portion thereof to extend down by a predetermined length. The flange portion 24a is provided on an end of the discharge pipe main body 24b at a side of the drain portion 20 and is configured as to be rectangular, shown from a plane thereof, corresponding to a shape of the packing 36. Screw holes, not shown, for allowing it to be attached on the drain portion 20 are respectively formed on four corners of the flange portion 24a.

The cap portion 26 functions as a cap of the collection container 34, which will be described later, and is attached to a lower end of the discharge pipe main body 24b. This cap portion 26 has a top surface portion 26a with a diameter that is almost the same as an outer diameter of the collection container 34 and a side wall portion 26b formed on a periphery of the top surface portion 26a. A spiral groove, not shown, corresponding to a spiral groove of the collection container 34 is formed on an inner circumferential surface of the side wall portion 26b. A cylinder like projection portion 26d for preventing the flux flown from the drain portion 20 into the collection container 34 from being solidified on an inner circumferential surface of the top surface portion 26a and/or the spiral groove of the side wall portion 26b is also provided in an inner surface side of the top surface portion 26a.

The collection container 34 is detachably attached to the cap portion 26 and contains the flux flown through the drain portion 20 and the discharge pipe 24. The collection container 34 is provided with a cylinder like container main body 34a, an upper end of which is open and a lower end of which is a bottom. On a periphery of the upper end portion of this container main body 34a, the spiral groove, not shown, is formed around its circumferential direction.

The decompression portion 60C is provided at each of the two collection containers 34 which are provided on both sides of the motor 12. The decompression portion 60C is composed of a container side connection portion 62, a connecting tube 64 and a main body side connection portion 66, not shown. The container side connection portion 62 is attached to a position of an outer surface of the top surface portion 26a of the cap portion 26, which is not conflicted by the position of the discharge pipe 24, and is communicated with an interior of the collection container 34 through the cap portion 26. The main body side connection portion 66 is attached to a side wall portion 40c constituting the cooling zone Z3 of the reflow furnace main body 40 and is communicated with the inlet S3 of the cooling zone Z3 (see FIG. 19). Of the connecting tube 64, an end is connected with the container side connection portion 62 and the other end is connected with the main body side connection portion 66.

As described above, according to the sixth embodiment, even if the drain portions are formed on the periphery of the motor base 16, it is possible to reduce the pressure at a side of the collection container 34 by the respectively provided decompression portions 60C. Accordingly, since an air flow toward the drain portions 20 occurs even on the inclined surface 16a of the motor base 16, it is possible to prevent the flux from being stagnated on the inclined surface 16a. As a result thereof, re-evaporation of the flux stagnated on the motor base 16 and a contamination or a drip of the stagnated flux can be avoided, and the flux can be flown into the collection container 34 efficiently so that it is possible to shorten a period of maintenance time for the reflow furnace 100D.

It is to be noted that a technical scope of this invention is not limited to the above-mentioned embodiments and contains various kinds of variations added to the above-mentioned embodiments without being deviated from a spirit of this invention. Although the other end of the connecting tube 64 has been connected to the inlet S3 of the cooling zone Z3 in the fourth through sixth embodiments, it is not limited thereto. For example, any drawing apparatus in which negative pressure occurs may be provided on the reflow furnace 100A and the other end of the connecting tube 64 maybe connected to this drawing apparatus. The drawing apparatus may be provided with any adjustment function to adjust, for example, a drawing level and the drawing level can be adjusted based on an amount of flux accumulated on the base member. This enables the flux on the base member to be more efficiently flown into the collection container 34. Further, if there is any space in which negative pressure occurs in the reflow furnace 100 other than the inlet S3 of the cooling zone Z3 as described above, the other end of the connecting tube 64 may be connected to the space.

Additionally, although the cases where the decompression portions 60A, 60B and 60C have been set on the cooling zone Z3 in the fourth through sixth embodiments, it is possible to apply the decompression portions 60A, 60B and 60C to the preheating zone Z1 and the main heating zone Z2, respectively. This enables any accumulation of the flux on the motor base 16 to be successfully prevented in the preheating zone Z1 and the main heating zone Z2.

DESCRIPTION OF CODES 10A, 10B, 10C, 10D, 10E, 10F . . . Flux Collection Apparatus; 12 . . . Motor; 14 . . . Rotation Axis; 16 . . . Motor Base (Base Member); 16a . . . Inclined Surface; 18 . . . High-Necked Collar Portion; 20 . . . Drain Portion; 30A, 30B . . . Flux Collection Portion; 24 . . . Discharge Pipe; 34 . . . Collection Container (Flux collection Portion); 38 . . . Drain Pipe (First Discharge Pipe); 40 . . . Reflow Furnace Main Body; 48 . . . Pipe (Second Discharge Pipe); 50 . . . Ejector (Decompression Portion); 60A, 60B, 60C . . . Decompression Portion; 70 . . . Printed Circuit Board; 72 . . . Heater; 74 . . . Fan; 80 . . . Conveyor; 90 . . . Heater for heating Flux; 100A, 100B, 100C, 100D . . . Reflow Furnace; S3 . . . Inlet; S4 . . . Outlet; Z1 . . . Preheating Zone; Z2 . . . Main Heating Zone; and Z3 . . . Cooling Zone.

The invention claimed is:

1. A reflow furnace comprising:
a reflow furnace main body including a motor, a fan connected with the motor through a rotation axis thereof and a case member containing the fan; and
a flux collection apparatus which collects flux generated by a reflow processing in the reflow furnace main body, wherein the flux collection apparatus includes:
a base member which is attached to the case member and has an inclined surface which is sloped so that from a periphery portion of the base member, a height of the inclined surface of the base member falls toward the rotation axis; and
a drain portion provided on a side of the base member that faces toward the fan, the drain portion being located in a part of the base member located circumferentially about the rotation axis, wherein the drain portion receives the flux generated by the reflow processing and collected toward the rotation axis of the motor by flowing along the inclined surface during rotation of the fan and drains the flux outwardly away from the rotation axis of the motor.

2. The reflow furnace according to claim 1, wherein the drain portion is provided with a discharge port for discharging the flux flown into the drain portion to the outside, and
the drain portion contains an inclined surface which is inclined from a level portion of the base member to the discharge port.

3. The reflow furnace according to claim 1, wherein the reflow furnace further comprises a collar portion that prevents the flux from coming into a space between the base member and the rotation axis.

4. The reflow furnace according to claim 1, wherein the reflow furnace further comprises:
a first discharge pipe that is connected with the discharge port of the drain portion;
a second discharge pipe that is detachably attached to an inner side of the first discharge pipe; and
a collection container that collects the flux discharged from the drain portion, the collection container being attached to an end of the second discharge pipe at an opposed side of the discharge port.

5. The reflow furnace according to claim 1, wherein the flux is a flux which is evaporated by the reflow processing, is flown into a space between the fan and the base member following the rotation of the fan, and is cooled to liquefy.

6. A reflow furnace comprising a flux collection apparatus that collects flux generated by reflow processing in a reflow furnace main body including a driving portion, a fan connected with the driving portion through a rotation axis thereof, and a case member containing the fan, wherein the flux collection apparatus includes:
a base member which is attached to the case member of the reflow furnace main body and has an inclined surface which is sloped so that from a periphery portion of the base member, a height of the inclined surface of the base member falls toward the rotation axis;
a drain portion provided on a side of the base member that faces toward the fan, the drain portion being located in a part of the base member located circumferentially about the rotation axis, wherein the drain portion receives the flux generated by the reflow processing and collected toward the rotation axis of the driving portion by flowing along the inclined surface during rotation of the fan and drains the flux outwardly away from the rotation axis of the driving portion;
a discharge pipe having an end connected with the drain portion through a drain pipe and an other end extending from the drain pipe toward a vertical direction; and
a flux collection portion which is detachably attached to the other end of the discharge pipe and collects the flux flown through the discharge pipe.

7. A reflow furnace comprising a flux collection apparatus which collects flux generated by a reflow processing in a reflow furnace main body including a driving portion and a fan connected with the driving portion through a rotation axis thereof, wherein the flux collection apparatus includes:
a base member which is attached to the reflow furnace main body and has an inclined surface which is sloped so that from a periphery portion of the base member, a height of the inclined surface of the base member falls toward the rotation axis;
a drain portion provided on a side of the base member that faces toward the fan, the drain portion being located in a part of the base member located circumferentially about the rotation axis, wherein the drain portion receives the flux generated by the reflow processing and collected toward the rotation axis of the driving portion by flowing along the inclined surface during rotation of the fan and drains the flux outwardly away from the rotation axis of the driving portion;
a flux collection portion which collects the flux through the drain portion; and
a decompression portion which reduces pressure within the flux collection portion.

8. The reflow furnace according to claim 7, wherein the reflow furnace main body contains a preheating zone, a main heating zone and a cooling zone,
the preheating zone, the main heating zone and the cooling zone are each respectively provided with an inlet to which gas is drawn and an outlet from which the gas is blown out, and
a first end of the decompression portion is connected with the flux collection portion and an other end of the decompression portion is connected with an inlet portion in the reflow furnace main body.

9. The reflow furnace according to claim 7, wherein a nitrogen injection portion for supplying nitrogen into the reflow furnace main body is connected with the reflow furnace main body through an ejector,
the ejector contains a nitrogen injection port, a nitrogen discharge port and an introducing port from which gas is introduced following the injection of the nitrogen, and
the decompression portion contains an end connected with the flux collection portion and an other end connected with the introducing port of the ejector.

10. A reflow furnace comprising a flux collection apparatus that collects flux generated by a reflow processing in a reflow furnace main body including a driving portion and a fan connected with the driving portion through a rotation axis thereof, wherein the flux collection apparatus includes:

a base member which is attached to the reflow furnace main body and has an inclined surface which is sloped so that from a periphery portion of the base member, a height of the inclined surface of the base member falls toward the rotation axis;

a drain portion provided on a side of the base member that faces toward the fan, the drain portion being located in a part of the base member located circumferentially about the rotation axis, wherein the drain portion receives the flux generated by the reflow processing and collected toward the rotation axis of the driving portion by flowing along the inclined surface during rotation of the fan and drains the flux outwardly away from the rotation axis of the driving portion;

a discharge pipe having an end connected with the drain portion through a drain pipe and an other end extending from the drain pipe to a vertical direction; and a flux collection portion which is detachably attached to the other end of the discharge pipe and collects the flux flown through the discharge pipe.

11. A reflow furnace comprising a flux collection apparatus that collects flux generated by a reflow processing in a reflow furnace main body including a driving portion and a fan connected with the driving portion through a rotation axis thereof, wherein the flux collection apparatus includes:

a base member which is attached to the reflow furnace main body and has an inclined surface which is sloped so that from a periphery portion of the base member, a height of the inclined surface of the base member falls toward the rotation axis;

a drain portion provided on a side of the base member that faces toward the fan, the drain portion being located in a part of the base member located circumferentially about the rotation axis, wherein the drain portion receives the flux generated by the reflow processing and collected toward the rotation axis of the driving portion by flowing along the inclined surface during rotation of the fan and drains the flux outwardly away from the rotation axis of the driving portion;

a discharge pipe having an end connected with the drain portion through a drain pipe and an other end extending from the drain pipe; and a flux collection portion which is detachably attached to the other end of the discharge pipe and collects the flux flown through the discharge pipe, wherein an outer diameter of the end of the drain pipe at a side of discharge pipe is set so as to be not larger than an inner diameter of the discharge pipe connected with this end so that the end of the drain pipe is inserted and attached to the discharge pipe.

* * * * *